US012665678B2

(12) United States Patent
Sangle-Ferriere

(10) Patent No.: US 12,665,678 B2
(45) Date of Patent: Jun. 23, 2026

(54) QUANTUM COMMUNICATION SYSTEM USING ENTANGLED PHOTONS

(71) Applicant: Bruno Sangle-Ferriere, Paris (FR)

(72) Inventor: Bruno Sangle-Ferriere, Paris (FR)

(73) Assignee: Bruno Sangle-Ferriere, Paris (FR)

( * ) Notice: Subject to any disclaimer, the term of this patent is extended or adjusted under 35 U.S.C. 154(b) by 249 days.

(21) Appl. No.: 18/290,885

(22) PCT Filed: Jul. 15, 2022

(86) PCT No.: PCT/EP2022/069961
§ 371 (c)(1),
(2) Date: Jan. 22, 2024

(87) PCT Pub. No.: WO2023/001721
PCT Pub. Date: Jan. 26, 2023

(65) Prior Publication Data
US 2024/0322916 A1 Sep. 26, 2024

(30) Foreign Application Priority Data
Jul. 22, 2021 (FR) ........................................ 2107957

(51) Int. Cl.
*H04B 10/70* (2013.01)
(52) U.S. Cl.
CPC .................................... *H04B 10/70* (2013.01)
(58) Field of Classification Search
CPC .................................................... H04B 10/70
See application file for complete search history.

(56) References Cited

FOREIGN PATENT DOCUMENTS

KR 20080034211 A 4/2008

OTHER PUBLICATIONS

De Martini et al., "Entanglement and Non-locality in a Micro-Macroscopic system" (published at https://arxiv.org/abs/0804.0341v1, Apr. 2008).*
International Search Report dated Oct. 28, 2022.
(Continued)

*Primary Examiner* — Casey L Kretzer
(74) *Attorney, Agent, or Firm* — IPSILON USA, LLP

(57) ABSTRACT

A quantum communication system (1) has an entangled photon transmitter (2) with a source which is configured to generate at least one pair of entangled photons. The pair of entangled photons has a first photon (P1) emitted on a first propagation path (D1) and a second photon (P2) emitted on a second propagation path (D2). A first receiver (3) is arranged on the first propagation path (D1) and has a first instrument (35), which is arranged to absorb the first photon in one of two complementary polarisations, and an optical selector (30), which is configured either to allow the first photon to pass towards the first measuring instrument (35) or to prevent it from being measured. A second receiver (4) is arranged on the second propagation path (D2) and has an optical amplifier (40), which makes it possible to demultiply the second photon while maintaining its polarisation, and a measuring instrument (45), which makes it possible to measure the average quantum state of the demultiplied photons (P20).

24 Claims, 13 Drawing Sheets

(56) References Cited

OTHER PUBLICATIONS

Ruo Peng Wang. "Superluminal telecommunication: an observable contradiction between quantum entanglement and relativistic causality" arxiy.org, Cornell University Library, 201 Olin Library Cornell University Ithaca, NY 14853, May 27, 2005 (May 27, 2005).

Shashi Prabhakar; "Two-photon quantum interference and entanglement at 2.1 um" Science Advances | Research Article; Prabhakar et al., Sci. Adv. 2020; 6 : eaay5195 Mar. 27, 2020.

* cited by examiner

[Fig 1A]

[Fig 1B]
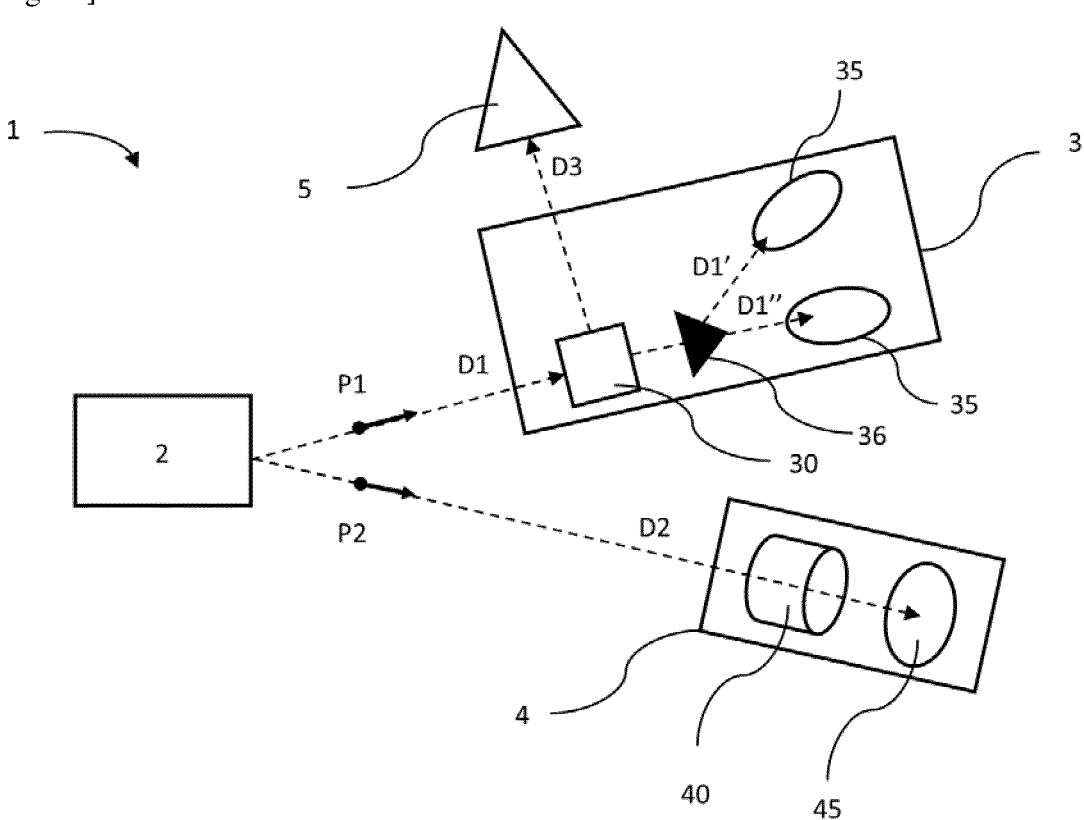
[Fig 2A]
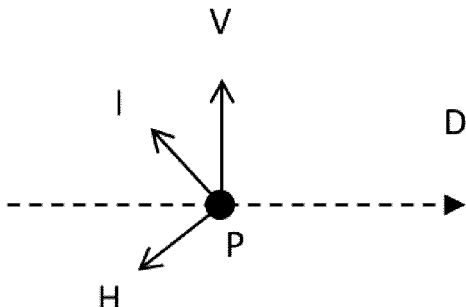

[Fig 2B]
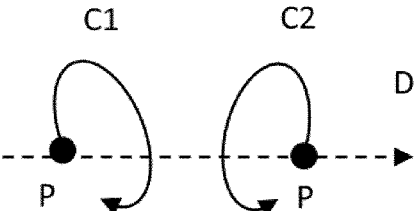
[Fig 3]
[Fig 4A]
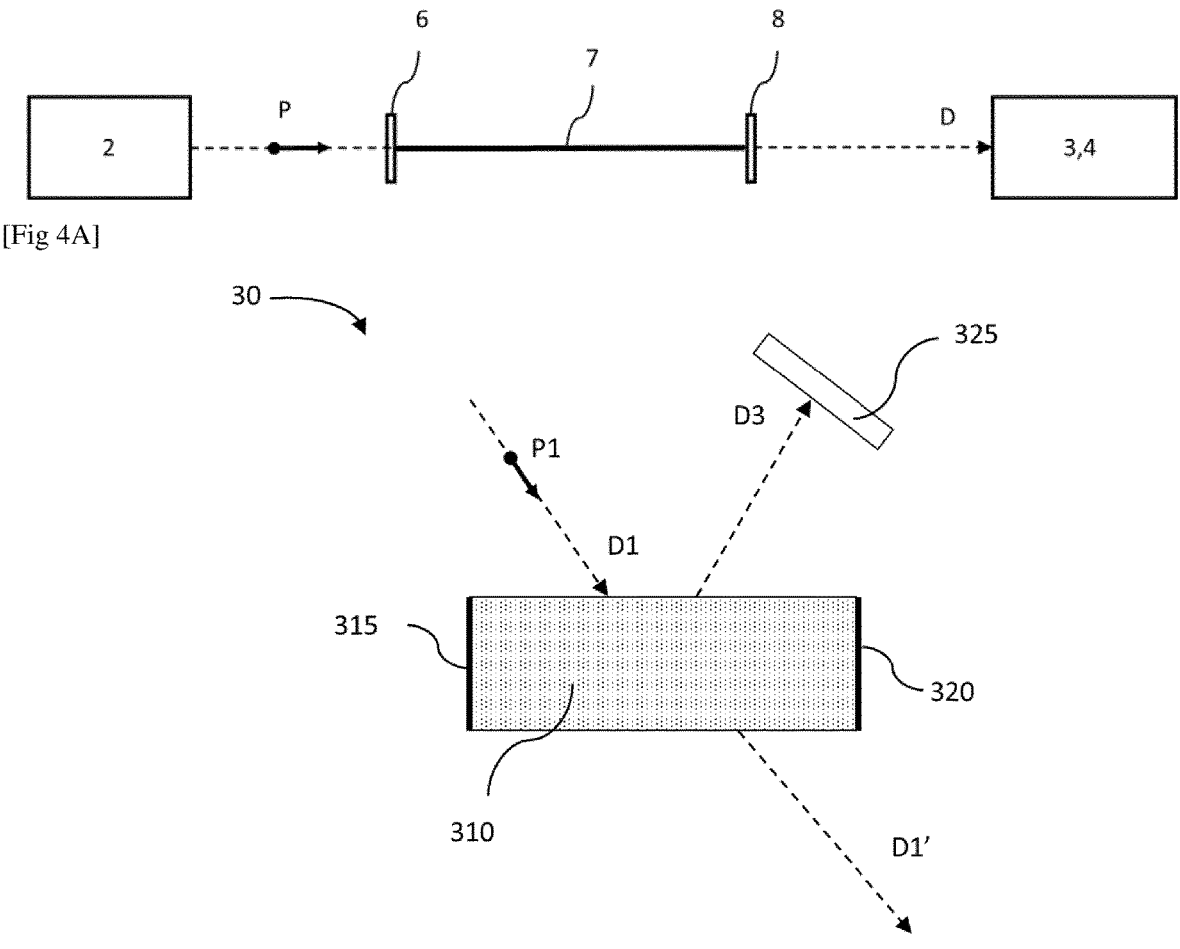

[Fig 5A]
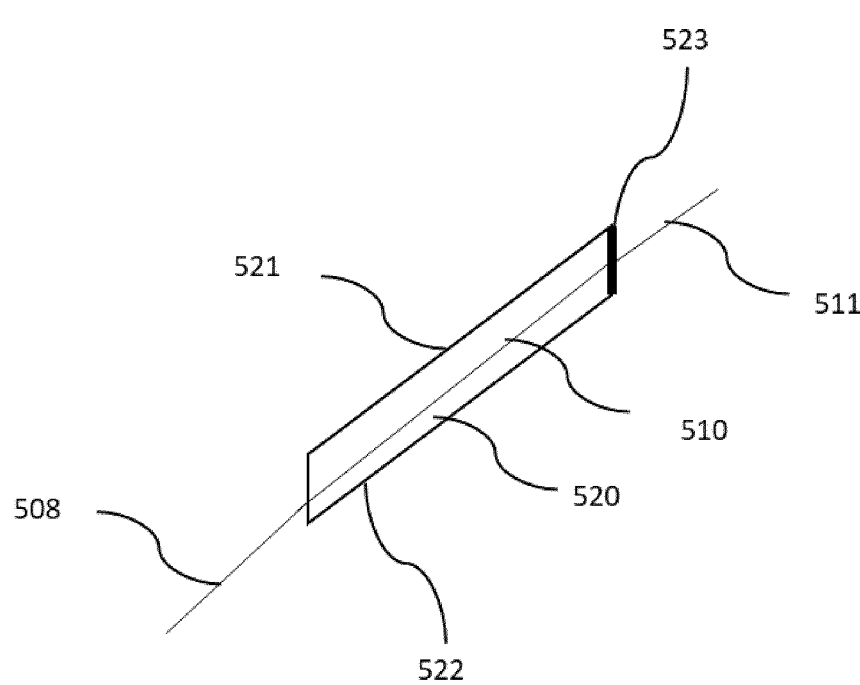

[Fig 5B]
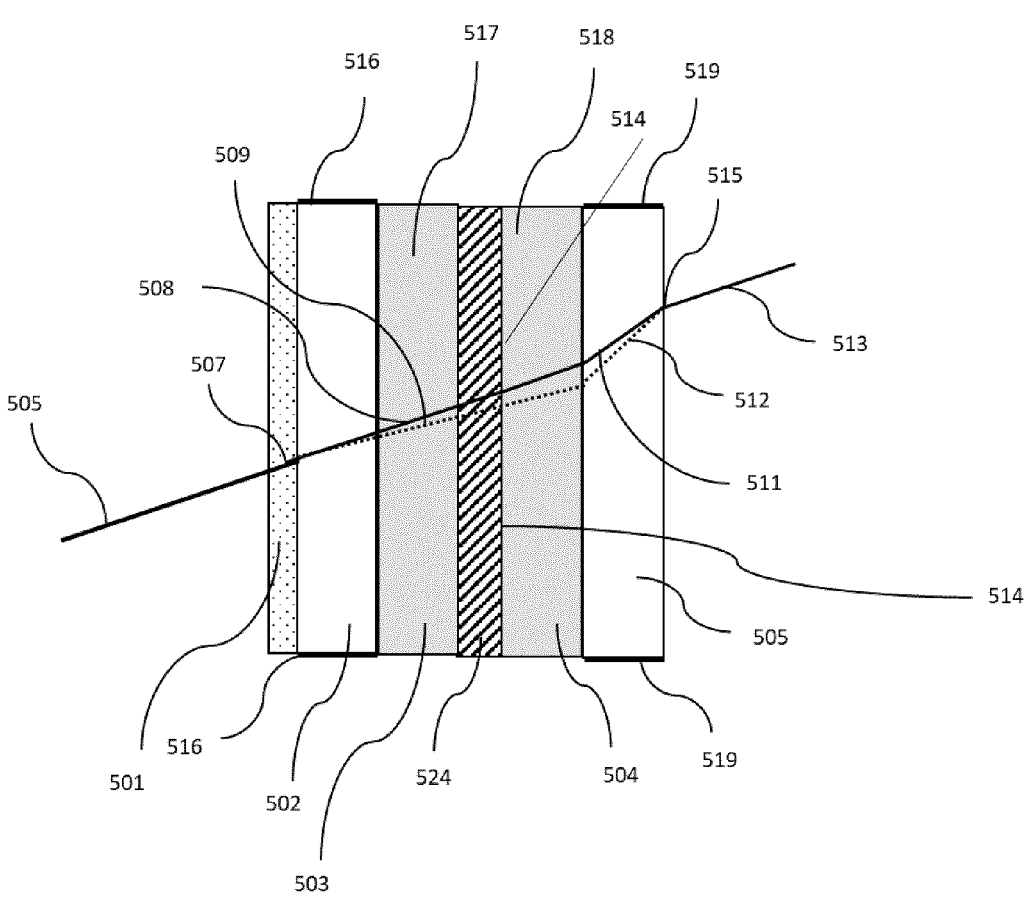

[Fig 5C]
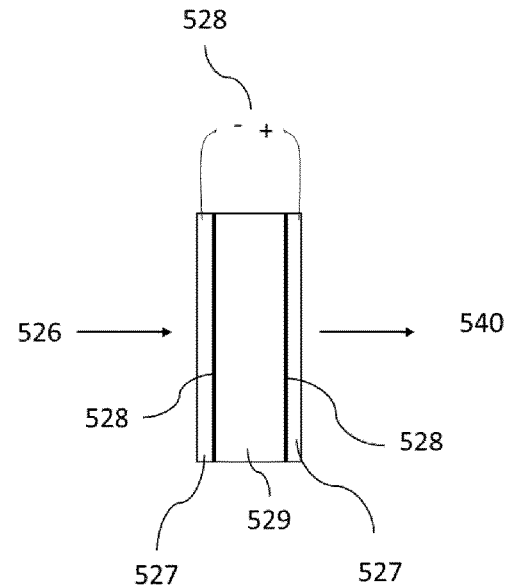
[Fig 6]
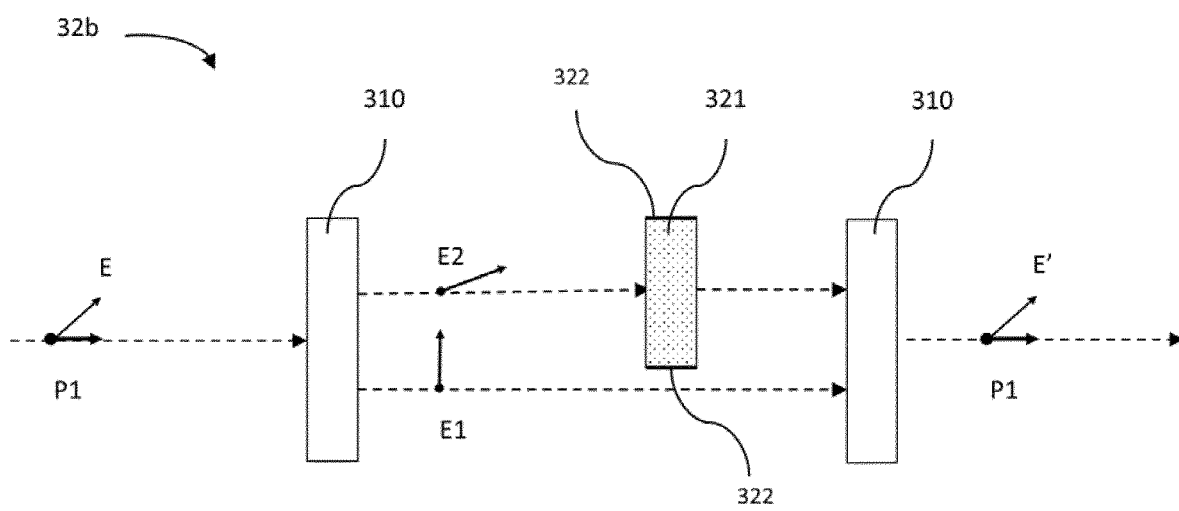

[Fig 7]
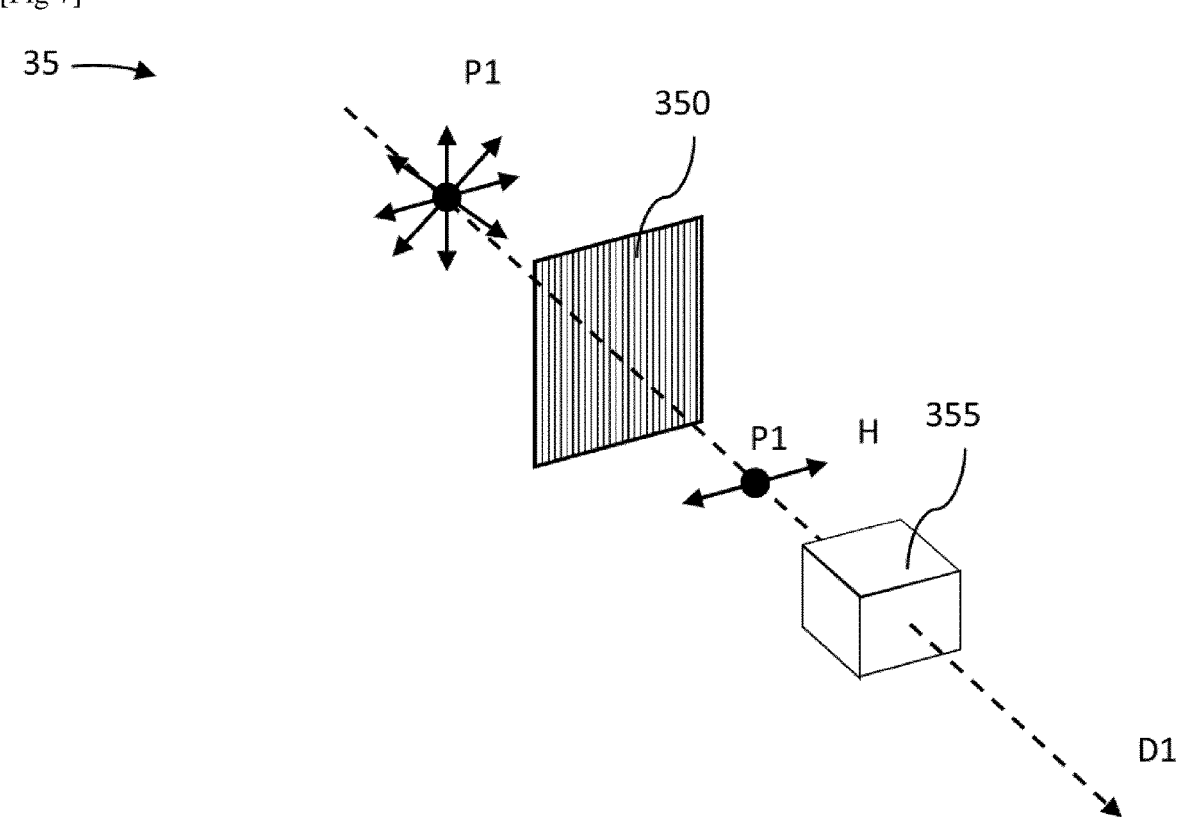
[Fig 8]
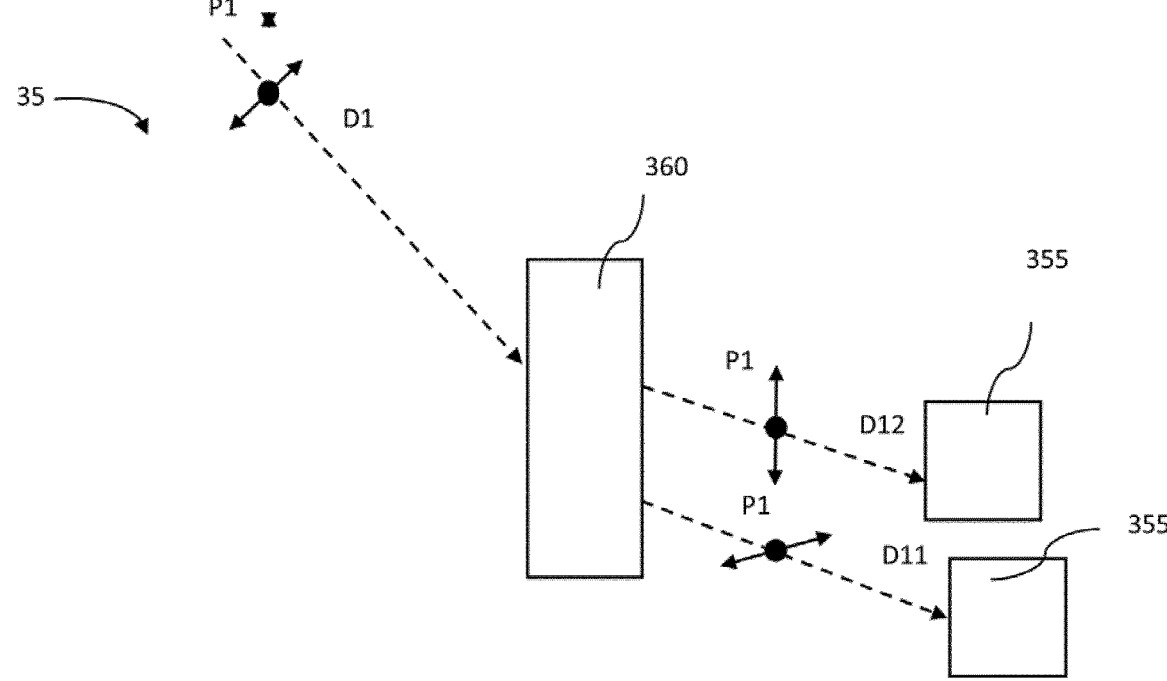

[Fig 9]
4
410    401    402
F
P2
N x P20
45
400
40
[Fig 10A]
45
4
40    452    452    452    453
N x P20
350
350
350
455    455
455
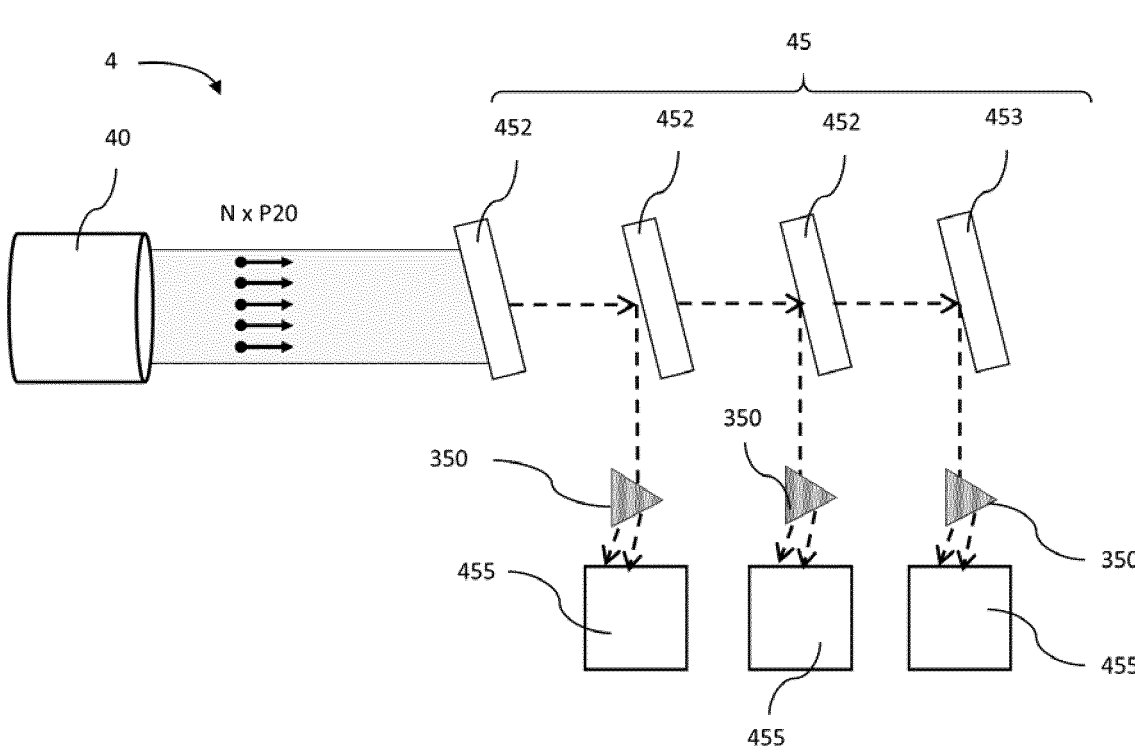

[Fig 10B]
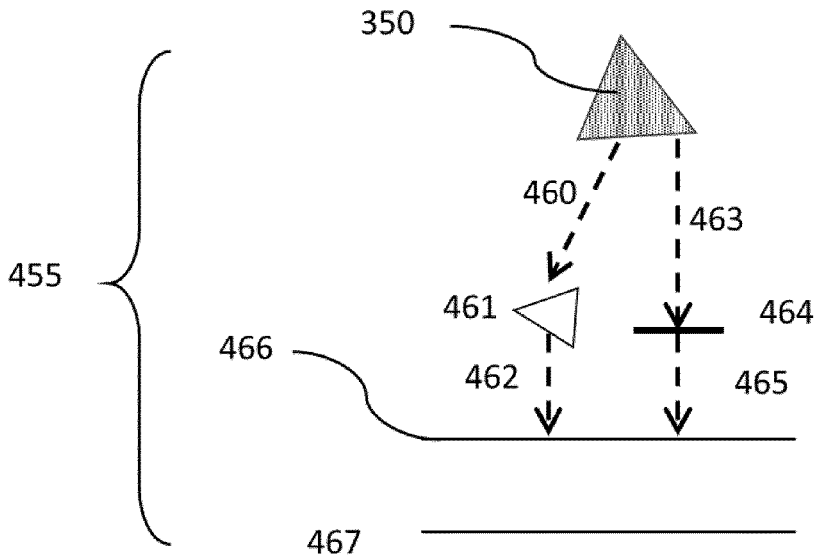
[Fig 11A]
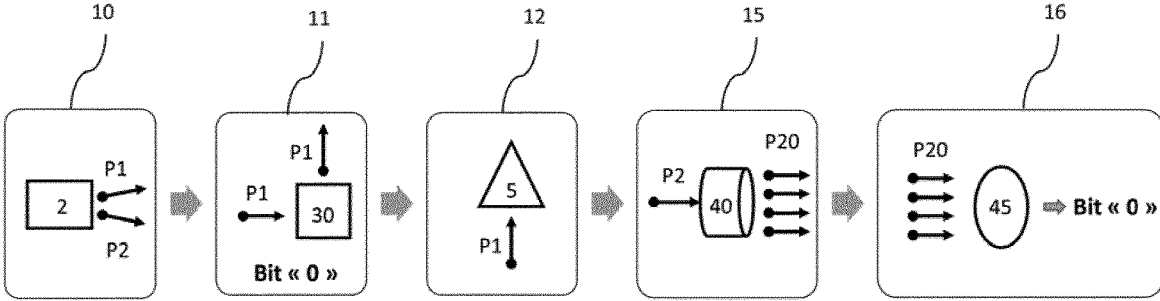

[Fig 11B]
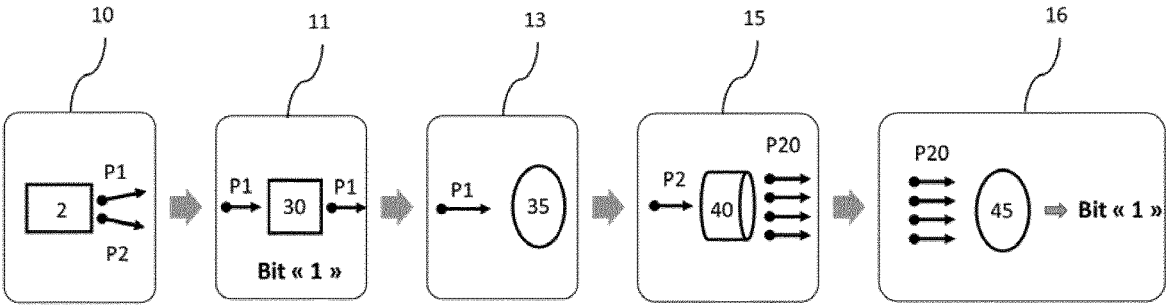
[Fig 12]
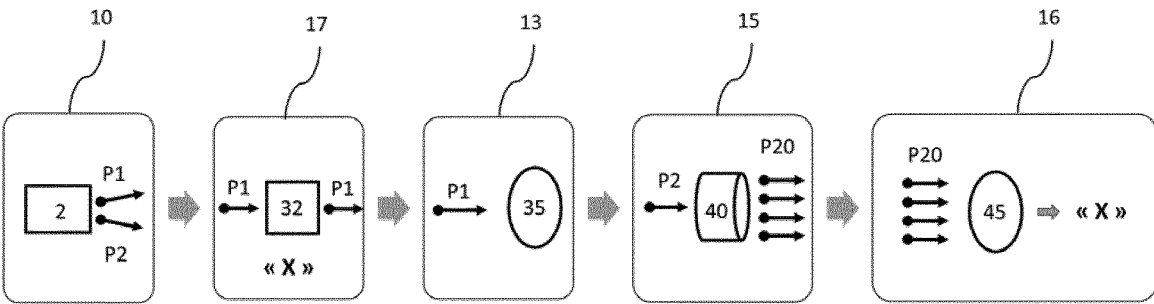

[Fig 13]
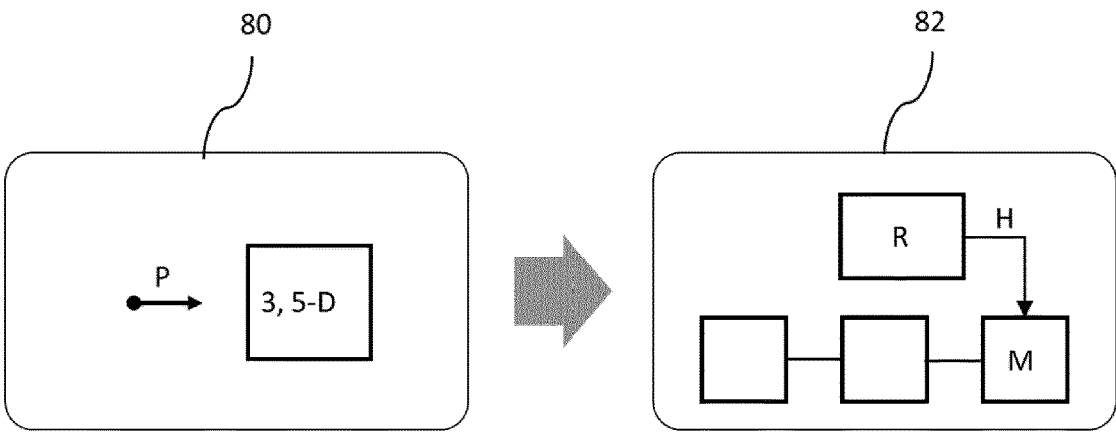
[Fig 14]
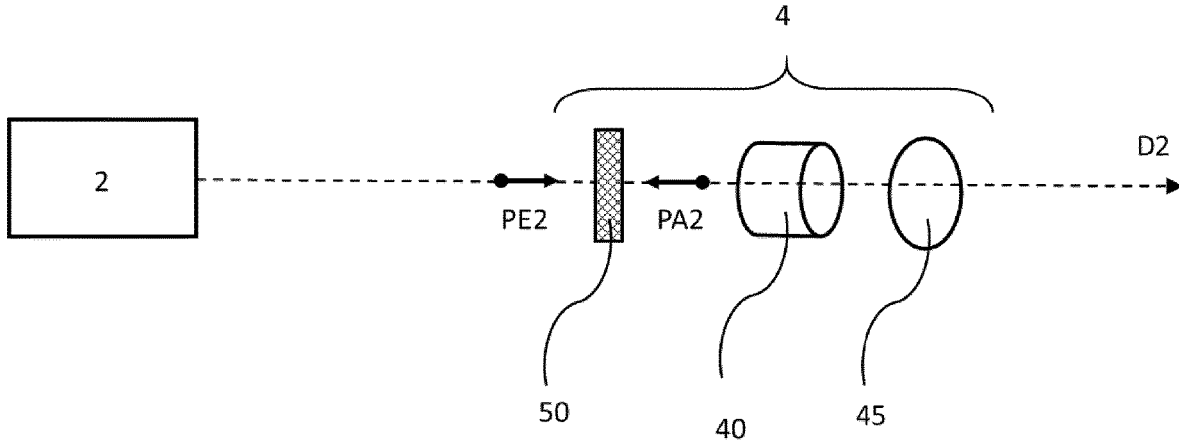

[Fig 15]
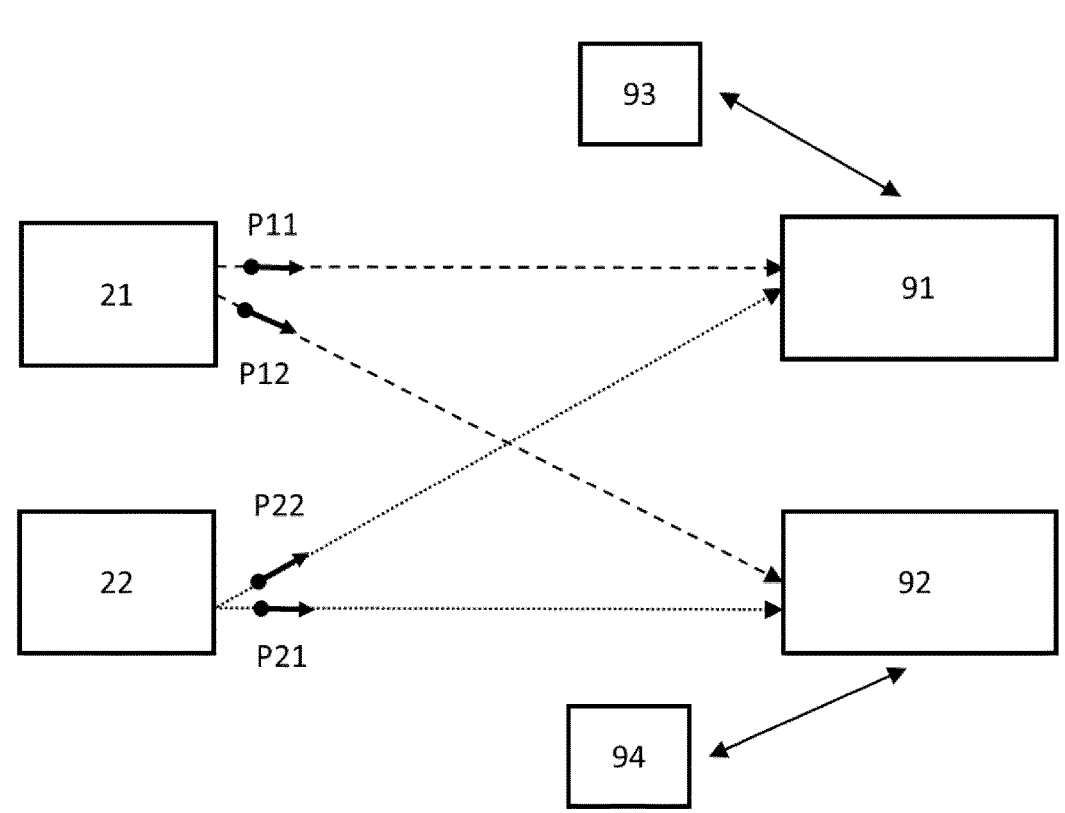
[Fig 16]
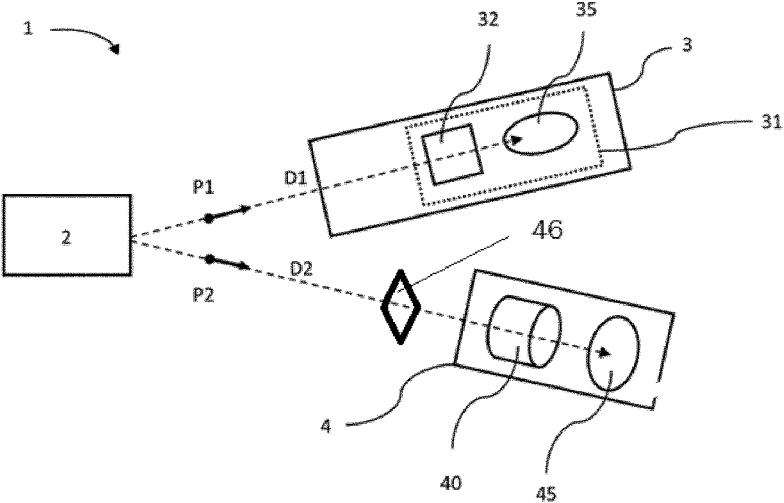

QUANTUM COMMUNICATION SYSTEM USING ENTANGLED PHOTONS

RELATED APPLICATION:

This application is a National Phase of PCT/EP2022/0069961 filed on Jul. 15, 2022, which claims the benefit of priority from French Patent Application No. 21 07957 filed on Jul. 22, 2021, the entirety of which are incorporated by reference.

TECHNICAL FIELD

The present invention relates to quantum communication methods, and more particularly to those which use a pair of entangled photons.

PRIOR ART

The transmission of information is currently carried out essentially using electromagnetic waves, whether they have short wavelengths, such as light, or long wavelengths, such as VHF waves.

The transmitted waves may be guided by metal cables or by optical fibers, or they may be transmitted through space.

These methods use propagation of the waves in order to transmit energy and therefore physical particles which, collected by a receiver, make it possible to deduce items of information, these being encoded for example by their wavelength or by modulation of the duration of the wave trains.

Recently, so-called "quantum" communication methods have been developed.

For example, the physical state of a photon, such as its polarization, may be used in order to transmit information, for example via an optical fiber. The value of a bit is assigned arbitrarily to a direction, or a polarization mode, of the photon. Sequences of polarized photons may then be sent in order to transmit binary sequences forming a message.

In the scope of quantum cryptography, it is in particular known to use a pair of entangled photons in order to transmit information securely. Entangled photons are photons whose quantum states, for example their polarization, depend on one another regardless of the distance between them.

This phenomenon of quantum entanglement has been observed and demonstrated experimentally a number of times, for example in the article by Shasi Prabkhar et al. "Two-photon quantum interference and entanglement at 2.1 μm" (Sci Adv, 2020)

Patent KR101003886B1 describes a system for transmitting encrypted information, in which entangled photons are emitted simultaneously and are each sent toward two targets positioned at different locations wishing to communicate with one another. The photons received by the two targets form entangled random sequences of conjugate bits, these sequences being used as cryptographic encryption keys. This system makes it possible to receive the same sequence of random numbers almost instantaneously at two different locations, but does not make it possible to transmit information.

The article by Wang "Superluminal telecommunication: an observable contradiction between quantum entanglement and relativistic causality" discloses a quantum communication system making it possible to transmit information superluminally by using a pair of entangled photons sent toward two receivers wishing to communicate with one another. The photons are entangled, and a linear polarization is measured for the photon arriving at the first receiver along different directions at 45° to one another. At the second receiver, the second photon is multiplied and the average polarization of the multiplied flux is measured in order to determine the direction along which the first photon was measured.

The polarization of a photon is not however necessarily binary, like that of a spin is, or even quaternary. It may in particular be represented on the Jones sphere which characterizes the orientation and the ellipse of the polarization: specifically, a polarization may be linear, the electric field always being parallel to an axis perpendicular to the propagation direction of the photon, or circular, the electric field rotating around this axis, or somewhere between the two: the electric field describing an ellipse around the propagation axis. In the case in which the polarization is not circular, the orientation measures the direction of this axis, and the eccentricity measures the flattening of the ellipse.

The aforementioned devices do not make it possible to exploit all the configurations of the polarization, and they are de facto limited in the number and type of items of information which it is possible to transmit.

DESCRIPTION OF THE INVENTION

There is a need to further improve quantum communication systems and methods, in particular those making it possible to transmit items of information, in particular continuous values, rapidly between two points, quasi-instantaneously and without a delay due to the transmission distance.

SUMMARY OF THE INVENTION

The invention aims to meet this need and, according to a first one of its aspects, achieves this by using a quantum communication system comprising:

- an emitter of entangled photons, comprising a source configured in order to generate at least one pair of entangled photons comprising a first photon emitted on a first propagation path and simultaneously a second photon emitted on a second propagation path different to the first propagation path;
- a first receiver arranged on the first propagation path, comprising a complex absorber configured in order to absorb the photon in a polarization state selected from among the states of at least two different pairs of complementary polarization states, with the exception of exactly two pairs of perpendicular linear polarizations in which the polarizations of one of the pairs are at 45° to the polarization directions of the other pair;
- a second receiver arranged on the second propagation path so as to be reached by the second photon after the first photon has reached the first receiver, said second receiver comprising:
  - an optical amplifier making it possible to multiply the second photon while preserving its polarization, and
  - arranged downstream of the amplifier, a measuring instrument making it possible to measure the average polarization of the multiplied photons.

The system according to the invention is arranged in order to transmit a series of continuous or discrete values quasi-instantaneously between two places.

Since the first and second photons are entangled, the absorption of the first photon at the first receiver instantaneously determines the polarization of the second photon, in particular before it reaches the second receiver.

Measuring the average polarization of multiplied photons at the second receiver then makes it possible to detect the polarization state in which the first photon was absorbed, and to deduce the transmitted information therefrom.

This system consequently makes it possible to transmit information without a latency time, regardless of the distance between the two places wishing to communicate, and by using only photons, which requires little energy.

The system is, for example, used for communication networks and computer networks on the Earth, in the sky and/or in space, particularly in order to communicate with systems far away from the Earth, such as satellites or spacecraft.

Jones Polarizations

The term "complementary polarization states", also referred to below as "complementary absorption polarization states" is intended to mean two polarization states of light for which the modification of the polarization of said light by linear optical elements, in particular mirrors, birefringent plates and/or prisms, including quarter-wave plates, for one of them allows its absorption by a first polarizing filter and for the other its absorption by a second filter polarizing along a polarization orthogonal to that along which the first filter can absorb.

In what follows, the terms "polarization state" and "polarization" are used interchangeably.

The first receiver is advantageously arranged so that its user can select the polarization state in which the photon is absorbed from among any one of the possible polarizations as defined by the Jones formalism, in particular from among a set of elliptical (also referred to as "ellipsoidal") polarizations characterized by the orientation and the ellipse of the polarization.

The polarization along which the photons are absorbed by the first receiver may thus be varied in order to transmit a series of items of information to the second receiver.

For example, by selecting 10 different polarization directions, for example spaced apart by 9° from one another, and 21 different phase shifts, also spaced apart by 9° from one another, 210 different polarization states may be defined and 210 different signals may thus be transmitted.

For example, letters of the alphabet in upper or lower case, numbers and a certain number of other special characters may be transmitted for each of the pairs of entangled photons reaching the receivers.

Complex Absorber

The term "complex absorber" describes an assembly which is reached by the first photon and makes it possible to determine a pair of complementary polarizations from among a certain number of pairs of complementary polarizations, and to absorb the first photon in one of the two polarization states of the predetermined pair.

Preferably, the complex absorber of the first receiver is configured in order to absorb the photon in one state of a predetermined pair of complementary polarizations, which is selected from among the states of at least three different pairs of complementary polarizations, and preferably from among a number of different pairs of complementary polarizations selected according to the number of different values to be transmitted, as described above.

Preferably, the complex absorber comprises:

at least one absorption instrument making it possible to absorb the photon in one or other of two states of a pair of complementary polarizations, for example two orthogonal linear polarizations.

a polarization modifier which is arranged upstream of said absorption instrument and is configured in order to convert the polarization of the first photon to the selected polarization along which said absorption instrument absorbs the photons.

The term "selected polarization" is intended to mean a pair of complementary polarizations which is predetermined according to the information to be transmitted.

Polarization Modifier

The linear polarization of a photon may be converted into ellipsoidal polarization, as represented by the Jones formalism, firstly by modifying the orientation of the polarization of a photon with a linear polarization and a known direction, thus distributing the electric field in a predetermined way between an axis x and an axis y perpendicular to the axis x, then secondly by modifying the phase of the electric field along one of the two perpendicular directions, for example the axis y.

The polarization modifier preferably comprises a polarization direction modifier arranged upstream of a polarization phase modifier.

For example, if $\theta$ is the angle of rotation of the linear polarization and $\phi$ is the phase shift along the axis y, $\omega$ being the angular frequency of the wave, the electric field components $E_x$ and $E_y$ after the rotation are:

$$E_x = E\,\mathrm{Cos}(\theta)\mathrm{Cos}(\omega t)$$

$$E_y = E\,\mathrm{Sin}(\theta)\mathrm{Cos}(\omega t)$$

and after the phase shift:

$$E_x = E\mathrm{Cos}(\theta)\mathrm{Cos}(\omega t)$$

$$E_y = E\mathrm{Sin}(\theta)\mathrm{Cos}(\omega t + \phi)$$

Polarization Direction Modifier

A linear polarization direction may be modified in various ways, for example by a half-wave plate or alternatively by a double quarter-wave plate.

The polarization direction modifier may comprise two quarter-wave plates arranged one after the other on the propagation path of the first photon, the orientation of at least one of the two plates being variable.

The first quarter-wave plate modifies, for example, the linear polarization into circular polarization, and the second quarter-wave plate converts, for example, the circular polarization into a linear polarization whose direction is orientated along an axis that depends on the direction of the axis of the second quarter-wave plate.

A rotation of the axis of this second plate therefore makes it possible to modify the direction of the linear polarization of the photon. If the plate is a half-wave plate, rotation of this said half-wave plate makes it possible to modify the direction of the linear polarization of the photon.

Alternatively, the orientation of the first quarter-wave plate may be modified, that of the second being fixed, or the orientations of both quarter-wave plates may be modified.

The rotation of a quarter-wave plate or of a half-wave plate is obtained, for example, by mechanical slaving to a sensor or to an electrically regulated device making it possible to rotate it, for example by friction on an axle set in movement by a piezoelectric material or by an electric motor device, for example operating with direct current.

Alternatively, a plurality of devices for rotating the linear polarization may be used, each allowing different angles of rotation, which are for example fixed but may quite possibly be modifiable, selectors making it possible to send the photons to one of these rotation device and, at the exit of said rotation device, to conduct said photon toward a common waveguide or to a common transmission axis.

These selectors may comprise a mirror, the direction of the axis of which is regulated for example by an electrical device, or alternatively they may consist of a prism or a plate made of a material whose refractive index depends on an electric field: a Pockels cell, or a transparent material having a nonlinear refractive index, or another light flux, for example transverse and preferably with a wavelength different to that of the photon and not capable of generating photons with a wavelength which is the same as that of the photon, which varies the refractive index of said nonlinear material and thus regulates the site and optionally the direction of the exit of the photon from said material. Since the rotational inertia of a quarter-wave plate may be high, the photons may be sent successively to different quarter-wave plates whose direction will have been adjusted beforehand, for example by one of the mechanical rotation devices described above, thus allowing time to modify the direction of each of these quarter-wave plates between two photon passes.

As a variant, chiral or rotating materials may be used in order to modify a linear polarization direction.

The polarization direction modifier may comprise a plate or a prism made of chiral or rotating material inducing rotation of the polarization by an angle dependent on the location through which the wave enters said chiral or rotating material. The material may, in particular, be arranged between two Pockels cells.

The first photon may be projected onto a first plate or a first prism forming a Pockels cell, the refractive index of which is controlled by an electric field in order for it to emerge therefrom at different locations, in particular onto an intermediate plate or prism made at least partly of chiral or rotating material that rotates the electrical polarization axis of the photon by an angle dependent on the location through which the wave enters said intermediate plate or prism, before entering a second plate or a second prism forming a Pockels cell, the refractive index of which is adjusted symmetrically with respect to that of the first plate or the first prism in order to make the photon emerge along the same direction as if the refractive indices of the first plate or prism and of the second plate or prism both had a fixed value. A third plate whose refractive index can also be adjusted, for example electrically, is advantageously placed after the second plate or prism in order to allow the location of the exit of the photon from the set of plates and prisms to be made independent of the refractive index selected for the first plate or prism.

The plate or prism made of intermediate material is, for example, composed of two contiguous symmetrical prisms which have the same refractive index but different chiral or rotating powers, the first of the two prisms having for example a chiral or rotating power and the second not having one, or alternatively rotating the electric field in the opposite sense to the rotation imposed by the first prism.

One of the two intermediate prisms may comprise a chiral material, for example nanoparticles of cadmium selenide (CdSe) with a diameter of about 1.4 to 2.4 nm, as described in the article by Visheratina, Anastasia, and Nicholas A. Kotov. "Inorganic nanostructures with strong chiroptical activity." (*CCS Chemistry* 2.3 (2020): 583-604); the other intermediate prism preferably not being chiral, or alternatively having a chirality opposite to that of said first intermediate prism. Since the rotation of the electric field of the waves passing through a chiral material is proportional to the thickness across said chiral material, the rotation of the electric field passing through the intermediate plate depends on the site through which it is entered by the light that passes through it.

One of the two intermediate prisms may furthermore comprise a "rotating" material, such as a superposition of an even number of quarter-wave plates stacked on one another in directions incremented by a predetermined angle at each layer, so that a wave polarized linearly along the axis of the first slice of the material emerges from the stack with a polarization rotated by an angle proportional to the thickness of the stack.

Polarization Phase Modifier

A second device, referred to as a "polarization phase modifier" may also be arranged downstream of the polarization direction modifier in order to phase-shift the component of the electric field of the photon by a predetermined angle along one of two fixed axes.

Preferably, the polarization phase modifier comprises a first birefringent plate or prism arranged in order to split the beam into two electromagnetic waves with a linear polarization, one along a first axis and the other along a second axis, and a retardation plate with a variable refractive index arranged on the second axis.

A "beam" is intended to mean a light wave which consists of the first photon in the sense of the duality of light.

The retardation plate causes the wave orientated along the second axis to acquire a predetermined phase shift with respect to the wave orientated along the first axis, before being mixed with it again by a new birefringent plate or prism making it possible to combine the two waves, the polarization fields of which are perpendicular, along the same axis.

The retardation plate may comprise a Pockels cell or a nonlinear material. The variable refractive index makes it possible to select the phase shift imposed on the wave orientated along the second axis.

In a first exemplary embodiment, as described above, the phase modifier rotates a linear polarization by angles spaced apart by 9° and varying between −45° and +36°, and varies the phase by angles spaced apart by 9° between −90° and +90°, thus defining 210 possible polarization states. As described below, 209 of the 210 possible polarizations are, for example, used in order to encode the data and the 210th linear polarization is used in order to absorb any entangled photon received in a predetermined time after the reception of a photon that has been used to encode a datum.

In a second exemplary embodiment, the phase modifier rotates the polarization axis by 45° before the photon is absorbed, in order to transmit for example a 0, and converts the polarization of the photon into circular polarization in order to transmit for example a 1.

Reflection of the First Photon

The invention furthermore relates to a quantum communication system comprising:

an emitter of entangled photons, comprising a source configured in order to generate at least one pair of entangled photons comprising a first photon emitted on a first propagation path and simultaneously a second photon emitted on a second propagation path different to the first propagation path;

a first receiver arranged on the first propagation path, comprising:

at least one first absorption instrument arranged in order to absorb the first photon in one of two states of a pair of complementary polarizations, the polarization of the photon being indeterminate in the observable basis according to which the first instrument absorbs the photons, an optical selector arranged upstream of said at least one first instrument and configured in order either to allow the first photon to pass through toward said at least one first measuring instrument or to prevent it from being measured;

a second receiver arranged on the second propagation path so as to be reached by the second photon after the first photon has reached the optical selector and/or after it has been able to reach the measuring instrument of the first receiver, said second receiver comprising an optical amplifier making it possible to multiply the second photon while preserving its polarization, and, arranged downstream of the amplifier, a measuring instrument making it possible to measure the average quantum state of the multiplied photons.

An "observable basis" refers to a basis of two complementary polarizations, for example two orthogonal linear polarizations.

The term "polarization indeterminate in an observable basis" refers to a photon whose polarization as observed in one of the two predetermined polarizations of an observable basis is not defined, that is to say it is random, for example equiprobable.

Since the first and second photons are entangled, the absorption of the first photon at the first receiver instantaneously determines the polarization of the second photon, in particular before the latter reaches the second receiver.

Measuring the polarization of the photons multiplied at the second receiver then makes it possible to detect whether or not the first photon has been absorbed, and to deduce therefrom the information which has been transmitted. The information transmitted by this system is, for example, of the binary type.

The first receiver may comprise at least one second absorption instrument, the optical selector being arranged upstream of the first and second instruments and configured in order either to allow the first photon to pass through while directing it toward one or other of the instruments or to prevent it from being absorbed.

The use of two instruments makes it possible to transmit three different items of information, for example the values 0, 1 and 2, the value 0 being for example assigned to reflection, the value 1 to the first instrument, and the value 2 to the second instrument.

Optical Selector

The optical selector of the first receiver may be of a variety of types. It is advantageously placed upstream of the measuring instrument in order to be able to prevent the incident photon from reaching the measuring instrument, if this is desired.

For this purpose, the selector preferably comprises a reflector, in particular a controlled mirror, making it possible for example to reflect the first photon on a propagation path different to its incident propagation path, in particular on a propagation path not containing the measuring instrument.

A "controlled mirror" refers to a device of which some properties, for example the refraction properties or the reflection direction, are controlled by an auxiliary device connected to the mirror, in particular an electronic device, for example one which generates an electric field.

The optical selector preferably comprises a device whose refractive index and/or reflection direction are controlled, in particular controlled by using an electric field or a light flux.

Alternatively, the optical selector comprises for example a Bragg mirror, in particular a Bragg mirror whose reflection direction is regulated by a piezoelectric material, which is itself controlled by an electric field.

As a variant, the optical selector comprises a prism, in particular comprising Pockels cells whose refractive index is controlled by an electric field, the application of an electric field making it possible to direct the photon toward the or one of the measuring instruments or toward a Bragg mirror, which is advantageously inclined with respect to the incidence direction of the electromagnetic waves reaching it so that said waves are reflected toward a location preferably different to that from which they come at the entry of the prism.

In another variant, the optical selector comprises one or a succession of Bragg filters, some layers of which are Pockels cells whose refractive index is controlled by an electric field, said Bragg filter reflecting the light wave or allowing it to pass through, according to whether or not the electric field is applied.

Alternatively, the Pockels cells used above may be replaced with nonlinear crystals illuminated by powerful light that can vary the refractive index of the medium through which the photon passes, the wavelength of the powerful light preferably being different to the wavelength of the photon.

The optical selector makes it possible in particular to orientate the photons in three different directions, one direction for example making it possible for the photons not to be detected, a second making it possible to measure a linear polarization of the photons and a third making it possible to measure a circular polarization.

Protection Device

Preferably, the quantum communication system furthermore comprises a device for protecting the quantum state of at least one photon, in particular a device which prevents the measurement or absorption of at least one photon, which is arranged in proximity to the first receiver so as to make it possible to protect the quantum state of the first photon after its reflection, preventing it from being absorbed or measured by one or more measuring instruments, said quantum state of the first photon being protected at least until the second photon has been multiplied at the second receiver.

The device for protecting the quantum state is placed close to the first receiver so as to protect the quantum state of the first photon when the latter is reflected and/or deviated from its incident propagation path by the optical selector in order not to be observed there, that is to say when it is not desired for it to be absorbed by the measuring instrument of the first receiver.

Preferably, the device for protecting the quantum state comprises a transparent space, in particular a transparent space and at least one mirror. The transparent space may be empty or filled with a gas or liquid.

Preferably, it comprises a plurality of Bragg mirrors which are arranged with respect to the transparent space so as to trap the photon which it receives, on a path of suitable length as described above, that is to say corresponding to the time which it takes for the second photon that has reached the second receiver to be amplified there.

As a variant, the protection device comprises an optical fiber with a length making it possible for the first photon to circulate therein while waiting for the second photon that has reached the second receiver to be amplified there.

In another variant, the device may be a portion of space or atmosphere which is empty or filled with a gas, for which it is ensured that no object reflecting or absorbing light passes through it.

Instrument for Absorption of the First Photon

At the first receiver, the first photon may be absorbed by at least one absorption instrument in one of two states of a pair of complementary polarizations.

Preferably, the absorption instrument comprises at least one filter making it possible to send the first photon toward at least one photon detector, in particular toward one or other of two photon detectors according to the polarization state of the first photon, the filter preferably being a prism or a plate made of a birefringent material.

The absorption instrument may furthermore comprise a polarizing filter and a photon detector located after said polarizing filter.

The absorption instrument may furthermore comprise a semitransparent mirror that reflects the circularly polarized photons toward a first photon detector and allows the others to pass through toward a second photon detector, as described in the article by Mai, Wending, et al. "Broadband transparent chiral mirrors: Design methodology and bandwidth analysis." (*AIP Advances* 9.4 (2019): 045305).

Emission of the Photons

Photon Pair Emitter

Preferably, the emitter generates pairs of entangled photons by spontaneous parametric down-conversion (SPDC), that is to say according to a process in which an initial photon, also referred to as a "pump" photon, is divided in two and its frequency is halved by a four-wave mixing phenomenon in an optical medium with a nonlinear refractive index, as is described in the article by Amanti et al, "les sources intégrées de photons intriqués au cœur des technologies quantiques" [Integrated sources of entangled photons at the heart of quantum technologies] (Photoniques, No. 91, 2018).

This type of photon pair emitter makes it possible to produce photons whose entanglement is comparatively robust, but has the disadvantage of sometimes producing more than one pair of photons at a time, which is undesirable because it is uncontrolled. Auxiliary devices may be implemented in order to deal with these "parasitic" multiple pairs, as is described below.

As a variant, an emitter comprising a quantum dot may be used in order to generate pairs of entangled photons, as described in the article cited above, which makes it possible to obtain pairs in a more regular way. The entanglement properties of the photons obtained with such a method may nevertheless sometimes be unstable.

Optical fibers made of a birefringent crystal may also be used, as described in the article by Smith et al "Photon pair generation in birefringent optical fibers" (Optics Express, Vol. 17, Issue 26, 2009).

Preferably, the emitter is configured in order to generate a plurality of pairs of entangled photons successively.

The entangled photons may be sent on first and second propagation paths at the exit of the emitter in various ways.

Emission in a Predetermined Polarization

The photons are preferably emitted in a predetermined polarization. The term "predetermined polarization" is intended to mean in one of the two states of a predetermined pair of complementary polarizations, for example a linear polarization with a certain direction. A birefringent plate may, for example, separate the two entangled photons according to their vertical or horizontal linear polarization.

A predetermined polarization of the entangled photons sent to each of the receivers makes it possible, in particular, to know the probability of a state in one polarization or its complementary polarization for any selected pair of complementary polarizations.

It is thus possible to generate series of random bits on reception of said photons by the receivers, said series being complementary at the two receivers, the polarization of a photon received at the second receiver being the polarization complementary to the polarization observed at the first receiver.

A predetermined polarization is also necessary when using quarter-wave plates at the first receiver in order to rotate the direction of the polarization of the first photon.

In order to emit photons along a predetermined linear polarization, a plate or a prism comprising a birefringent optically transparent material, for example lithium niobate or rutile ($TiO_2$), the optical indices of which depend on the light polarization axis with which at least one of the two photons passes through, is for example arranged at the exit of the emitter.

This photon therefore emerges from the prism at one of the two different locations, depending on the linear polarization.

If the source of entangled photons emits the two photons in the same direction and along an axis perpendicular to the ordinary axis of the birefringent optically transparent material, the first photon is collected at the exit of the prism at the location through which the electromagnetic waves whose electric field is parallel to the ordinary axis of the birefringent optically transparent material emerge, in order to send it toward the first receiver.

In the same way, the second photon emerging through the location where the electromagnetic waves whose field is perpendicular to the ordinary axis emerge is collected in order to send it toward the second receiver.

In the case in which the two entangled photons are generated from the emitter at different locations and/or in different directions, it is possible to project each of the two photons onto birefringent prisms in a direction perpendicular to the ordinary axis of each of the prisms and to redirect each photon toward the receiver which is intended for it, the photons emerging through different locations of the prisms then preferably being lost or destroyed by projection onto an absorbent surface.

It is for example possible to use, for the first entangled photon, the one emerging from a first birefringent plate or a first birefringent crystal with a linear polarization parallel to the first axis, and as the second entangled photon, the one emerging with a linear polarization parallel to a first axis of the crystal used for the second plate or the second prism, which will have been adjusted in order to allow the photons to emerge along a predetermined polarization corresponding to the polarization of the photons that are entangled with the photons emerging from the first plate or the first birefringent prism with a direction parallel to the first axis.

In order to facilitate the transport of said photons toward the receivers, birefringent retardation plates that convert the linear polarizations of said photons into circular polarization are preferably placed at the exit of the locations from which the photons emerge from the prisms.

Another birefringent retardation plate is then preferably arranged at the entry of each of the receivers in order to reconvert the circular polarizations of the photons into linear polarization, this conversion into linear polarization making it possible to adjust the polarization axis precisely.

Transmission of the Photons

The photons may be transmitted from the emitters toward the receivers through space, through the atmosphere, an optical fiber or a combination of these means.

Lenses may be used for the transmission of the photons, in particular for transmission through space or the atmosphere. As appropriate, antireflection layers are preferably arranged on said lenses. The size of the lenses used is preferably matched to the length of the spatial or atmospheric transmission of the photons.

Conjugate mirrors which reflect the light emitted at the emitter may be used in order to adjust the emission direction of the conjugate photons for spatial or atmospheric transmission. A laser light emitter may, for example, scan a space in order to detect the receiver therein, the receiver reflecting the emitted light to it and the direction of the conjugate photons then being adjusted in order to be parallel to or coincide with the direction of the light reflected by the conjugate mirrors.

The light emitted by the laser light emitter may have a wavelength close to the wavelength of the entangled photons and be introduced into the objective lens used by the photons through a dichroic prism.

As a variant, if the wavelength is the same as that of the entangled photons, the light may be introduced through a birefringent prism when said photons have a linear polarization, the polarization of the light used for the guiding then being perpendicular to the polarization of the entangled photons directed toward the same receiver. A Pockels cell upstream of the receivers may be used to guide the light toward the conjugate mirrors when the guiding light arrives.

In another variant, the light waves used for the sighting may be emitted parallel to the entangled photons but separated for example by a distance of a few centimeters in order to be reflected by the conjugate mirrors.

In another variant, it is possible not to use a conjugate mirror but nevertheless to sight the receivers or targets close to them, the information according to which the targets are received being communicated by another communication means, for example by a radio signal or by quantum transmission.

The zone to be scanned may be identified by mapping reconnaissance of the zone in which said receivers are likely to be located.

The aforementioned phase modifier may moreover be used when the receivers are in relative rotation with respect to the emitter, in particular because of the rotation of the Earth or of the satellites, in order to allow the photons emitted in a fixed direction with respect to the emitter to enter each of the receivers with a fixed direction that is determined relative thereto.

Calibration Methods

The various mediums through which the photons pass from their place of emission to the two receivers may give rise to modifications of their phase which are not necessarily desired or expected.

Furthermore, these modifications may be different according to whether the photons are directed toward the first or the second receiver. Lastly, these modifications may vary in the course of time, in particular as a function of the weather or the temperature of the materials during their use.

The system according to the invention may be calibrated periodically by having the photons absorbed by the first receiver in polarizations belonging to predetermined pairs of complementary polarizations and, for each of these pairs, by observing one of the two possible polarizations in which the entangled photon is detected by the second receiver.

Thus, the invention furthermore relates to a method for calibrating a system as defined above, making it possible to determine the polarization state of a photon reaching the second receiver as a function of the polarization state in which its entangled photon has been absorbed at the first receiver, the method comprising the steps consisting in:

generating pairs of entangled photons from an emitter, the first photon of the pair being emitted toward a first receiver and the second photon of the pair being emitted simultaneously toward a second receiver, the first and second photons being entangled in terms of their polarization state, absorbing the first photons at the first receiver in a predetermined pair of polarizations, storing the one of the two possible polarizations in which each photon has been absorbed, and stopping the sending of photons by the emitter as soon as a predetermined number of each of the different polarizations have been observed, at the second receiver, duplicating the second photons to form fluxes of multiplied photons by using an amplification device, each multiplied photon having preserved the polarization state of the second photon, measuring the polarization states, that is to say the polarization directions and phase shifts of each flux of multiplied photons, and storing these measurements as well as their reception times, transmitting the list of stored polarizations and reception times of the photons from the first receiver to the second receiver, deleting from the list of photons received at the second receiver the photons which do not correspond to photons received at the first receiver and, likewise, deleting from the list of photons received at the first detector the photons whose corresponding photon has not been received at the second receiver, and calculating with the aid of, on the one hand: knowledge of the polarization state of two photons which are detected in complementary polarizations at the first receiver and whose entangled photons have reached the second receiver, and on the other hand knowledge of the polarization state of the corresponding entangled photons received at the second receiver, the Jones matrix making it possible to deduce the polarization of the photons received at the second receiver from the polarization of the photons received at the first receiver.

The storing of the states as well as the calculation of the Jones matrix are carried out by any suitable electronic devices, for example a microcontroller.

The Jones matrix calculated in this way makes it possible to calculate the polarization of the second entangled photon received at the second receiver as a function of the polarization of the absorption of the first photon by the complex absorber located at the first receiver.

A second calibration may be carried out, consisting in determining the probability for any photon arriving at the second receiver, the entangled photon of which has been absorbed during its transit toward the first detector, of belonging to each range of pairs of complementary polarizations which is detectable or identifiable by the second receiver; the range of a polarization P being defined as the set of polarizations assimilated by the polarization measuring instrument as having the polarization P.

Thus, the invention furthermore relates to a method for calibrating a system as defined above, making it possible to determine the probability of losing a photon during its transit from the emitter to the first receiver, consisting in:

configuring the complex absorber of the first receiver in order to absorb the photons received at the first receiver in one of two complementary polarizations of a pair of absorption polarizations, successively generating a plurality of pairs of entangled photons from an emitter, the first photon of the pair being emitted toward a first receiver and the second photon of the pair being emitted simultaneously toward a second receiver, the first and second photons being entangled in terms of their polarization state, counting the number of photons received at the second receiver in each of the ranges of polarizations, detectable by the second receiver, which are different to one of the two ranges of polarizations of the entangled photons of the photons absorbed by the first detector.

It is thus possible to detect polarization ranges in which the entangled photons of photons lost in the course of transmission during their transit toward the first detector arrive in priority, or most probably, and thus preferably to avoid using the corresponding absorption polarizations in order to transmit data from the first to the second receiver.

It is thus possible, by taking the quotient between the number of photons received at the second receiver with one of the polarizations corresponding to one of the two absorption polarizations at the first receiver, to calculate a transmission ratio of the photons between the emitter and the second receiver.

Measuring Instrument of the Second Receiver

The measuring instrument of the second receiver preferably comprises at least one photon detector arranged in order to measure the polarization of the light originating from the multiplication of the second photon.

The measuring instrument of the second receiver comprises, for example, a succession of semireflective plates arranged downstream of the optical amplifier, said plates directing the flux of multiplied photons, that is to say the light flux, with an equal intensity toward polarization measuring instruments arranged, for example, in order to measure the intensity of the flux along two perpendicular axes and/or the phase shift of the light between these two same axes.

The light may also be directed toward various polarizing filters after having passed through one or a succession of lenses which magnify the cross section of the light beam, thus allowing a plurality of mirrors or lenses to direct portions of this light beam toward the various polarization measuring instruments.

The various polarization measuring instruments preferably make it possible to:

measure the intensity of the component of the electric field of the light along a first axis x, measure the intensity of the component of the electric field of the light along a second axis y perpendicular to the first axis x, measure the phase shift between the light along its axis x and along its axis y, and, preferably, measure the phase shift between the light along its axis x', which is the bisector of x and y, and the light along its axis y'.

The measurement of the intensity of the light along two perpendicular axes is carried out, for example, by separating the light along two perpendicular axes by a birefringent plate or a prism followed by two light intensity sensors placed at exits of said plate or said prism. The measurement of the phase shift between two perpendicular components is carried out, for example, by separating the light along two perpendicular axes by a birefringent plate or prism followed, for the wave polarized along one of the two axes, by a rotation of this polarization axis by 90°, for example by using a rotating or chiral material or by the succession of quarter-wave plates, then a joint projection of these two waves, one of which has undergone the rotation of its electric field, through Young's slits onto a screen, the interference of the two light sources creating fringes whose positions depend on said phase shift.

Optical Amplifier

An "optical amplifier" refers to a device making it possible to duplicate a photon which is introduced into it, in particular the second photon of a pair of entangled photons, while preserving its polarization state.

Preferably, the optical amplifier is a doped-fiber amplifier.

For example, an erbium amplifier (EDFA) may be used, for example with a length of 4 m, into which the photon to be amplified is introduced at the same time as an amplifying wave with a shorter wavelength, which makes it possible to amplify the wave corresponding to the photon introduced with gains which may be of the order of 37 dB/m.

It is also possible to employ a doped-fiber amplifier (DFA) using a dopant other than erbium.

As a variant, the optical amplifier is for example a vertical-cavity amplifier (VCSOA), or an amplifier of the semiconductor type (SOA).

Antireflection Layers

In order to avoid the loss of photons, antireflection layers are preferably arranged at the interfaces between the adjacent transparent media with a different index through which the photons pass, as well as at the interfaces of the birefringent prisms and plates through which the photons pass, the antireflection layer preferably being matched to the index or indices of the material and to the angle or angles of incidence and polarization directions as well as to the wavelength of the photon which is intended to pass through it.

Dichroic Filters

The first and/or second receiver preferably comprise one or more dichroic filters making it possible to allow only the photons with a given wavelength to pass through, in particular a prism consisting of a dispersive transparent material, the filter or filters preferably being arranged before the measuring instrument or instruments or before the optical selector for the first receiver, this being the case particularly if the refractive indices of the nonlinear materials are modified by applying powerful light fluxes.

Assignment of the Photons to the Information with Synchronized Clocks

When the photons arrive at the second receiver, it is useful to be able to distinguish whether they should be assigned to the information transmitted, if it is an item of information transmitted several times, or whether it is an item of information that has not been encoded onto a pair of entangled photons.

This is because the photon emissions are sometimes irregular, and for example an emitter of the SPDS type as mentioned above may emit a double pair of photons without this being desired.

The emitter and each of the receivers preferably comprise a clock, the clocks of the emitter and of the receivers being synchronized with one another.

When combined with knowledge of the time of flight of the photons between the emitter and each of the receivers, this makes it possible to determine encoding and reception periods, which are preferably repetitive, during which a photon may be encoded at the first receiver in the encoding periods and its entangled photon may arrive at the second receiver in the reception periods.

If a plurality of photons are received during a reception period, the first receiver preserves an unchanged state until a moment lying, for example, between one quarter of the non-emission time after the end of the reception period and one half of the non-emission time $\delta t'$ before the next reception period.

The second receiver preferably records the bits received for each reception period. It then advantageously transmits to the first receiver periodically, particularly if the device uses reflection in order to transmit a bit or a trit, for example, every 3000 reception intervals, or every 100 reception intervals without a photon, a list of the reception periods for which it has not received a photon, the transmitted photon possibly having been lost or no photon having been emitted by the emitter for this period, without the first emitter knowing whether it has reflected photons during these same periods, particularly if the device does not have a photon detector.

The transmission of this list may be carried out by instantaneous communication using the method according to the invention described below, or by a conventional communication means. On reception of this list, the first receiver then transmits the bits corresponding to these transmission periods for which no photon has reached the second receiver.

As a variant, the first receiver uses only the two different measuring instruments in order to transmit the information, one detecting linear polarizations and the other detecting circular polarizations.

The first receiver then retransmits each bit while selecting the measuring instrument suitable for the bit which it will transmit for this transmission period, and preferably keeps the selector in the same state until the end of the transmission period for which it receives a photon, allowing it to select the measuring instrument to be used for the transmission of the next bit.

The second receiver, when receiving the photons during the transmission periods, if it receives some of them, measures their polarization state for each transmission period and deduces therefrom the bit which it should add to the list of bits received.

If the transmission line between the emitter and the first receiver has a certain opacity and may absorb a certain proportion of the photons which pass through it, some photons may arrive at the second receiver with random polarizations during the reception periods.

The second receiver may then be configured in order to recognize at least some of the photons arriving in a polarization state which cannot be that of an entangled photon absorbed or reflected at the first receiver.

Offset of the Clocks

Preferably, the clocks which are components of the system, namely of the emitter and of the two receivers, are configured in order to take into account the phenomenon of a different running of time at different locations, in particular different altitudes of each of the components.

Synchronization of the Transmission Periods Between Receivers

A method which allows the first and second receivers to synchronize their clocks may be implemented.

For example, when measuring a first photon, the first receiver uses its own clock to note the time at which said photon has impinged on the measuring instrument.

The noted time, as well as preferably the references of the transmission interval, in particular the start time and optionally the duration in which the photon was expected, are subsequently transmitted to the second receiver.

The second receiver notes the reception time of the second photon in order to adjust its own clock so that the offset between the beginning of the transmission period and the time at which the first photon impinged on the measuring instrument of the first receiver is the same as the offset between the beginning of the reception period of the second photon at the second receiver and the time given by the clock for the reception of the second photon.

If the transmission lines between the emitter and one or other of the receivers absorbs some photons, the emitter may send photons in a predetermined number, or over a predetermined duration, and each of the two receivers may note the average reception time of each of the photons, then one of the receivers may communicate this said average time to the other receiver.

The average time may be calculated by taking the average of the reception times of each of the photons, or only of the first and last photon received. The predetermined number of photons sent or the duration of their sending are preferably adjusted in particular as a function of the transmission/loss ratio of each of the photons on each of the two routes between the emitter and the receivers, and the average sending frequency of the photons.

Since the transit durations of the photons between the emitter and each of the receivers may be different, the synchronization of the clocks between each of the receivers may differ depending on whether transmission of information in one direction or the other is involved. Each of the receivers may then have a synchronization register used to increment the clock time of said receiver with, or conversely subtract therefrom, a time lapse which is adjusted during the synchronization, in order to deduce therefrom the time of a clock which is synchronized for the reception of information coming from the other receiver.

Transmission Between the Emitter and Receiver

A method may be implemented which makes it possible to synchronize the periods of sending the photons to the receivers and the periods of reception at the receivers, these periods being time intervals during which photons can leave the emitter or reach the receiver.

For this purpose, the emitter may emit a brief first light signal followed or preceded by other light signals forming a message, which are preferably signed by a digital signature indicating the precise time, on its clock, of sending the signal.

On reception of said first light signal, the receiver notes the reception time then reads the sending time of the signal, takes the difference between the time of sending the signal and the time of the start of the period of transmission of the photons, during which the signal was sent, or, if it was sent outside a transmission period, the beginning of the preceding transmission period, and does the same with the reception time of the signal and the times of the beginning of the reception period.

If the difference between the emission date of the signal and the beginning of the transmission period is more than the difference between the reception date and the beginning of the reception period, the receiver may move the beginning of the transmission period forward, or conversely in the opposite case.

The calibration is advantageously repeated several times and the results are averaged, thereby making it possible to adjust the clocks with a precision greater than the imprecision of the sending and reception times of said light signals.

The wavelength used for the light signal is preferably the same as the wavelength of the entangled photons, so that it can be transmitted at the same speed as the entangled photons.

Assignment of the Photons to the Information without a Synchronized Clock

As a variant to synchronized clocks, the first receiver may comprise detector-transmitters and a waiting element, for example a reflector arranged in order to reflect the first photon with a predetermined polarization different to the polarizations detectable by the detector-transmitters, or alternatively an element arranged in order to absorb the first photon in a predetermined polarization different to the polarizations of the detector-transmitters.

The polarizations of the detector-transmitters are preferably complementary so that any photon directed toward an absorbent waiting element is absorbed.

The detector-transmitters are preferably arranged in order to detect the polarization of the photons in at least four different polarizations, these polarizations being grouped in complementary pairs so that any photon directed toward a detector-transmitter is thus detected and absorbed regardless of its initial polarization.

The detector-transmitter or detector-transmitters of the first receiver are used in order to send the information by selecting the detector pair used.

Each photon received by the first receiver during a predetermined period, also referred to as a "resting period", after the reception of a photon that has been used to send an item of information is sent to the waiting element, the duration of this predetermined period preferably being fixed and preferably being more than two times the clock imprecision of the receivers, and the start of this resting period being determined by the sensor or one of the two sensors absorbing the photon that have been used in order to send the information.

The second receiver is preferably arranged in order, on the one hand, to ignore the photons paired with the photons sent toward the waiting element, and on the other hand, to interpret two successive photons not paired with photons sent toward the waiting element as successive bits if they are separated from at least the resting period, from which the clock imprecision of the receivers is subtracted, and lastly to interpret two photons received successively in a time less than or equal to three quarters of the resting period, for example, as representing the same bit.

The second receiver may thus detect an error in the transmission of the information if: two consecutive photons with different polarizations, not paired with photons sent toward the waiting element, are received in a time less than the resting period minus the clock imprecision of the receivers.

This method has the advantage of requiring neither the placement of a switch at the emitter in order to restrict the emissions of entangled photons, nor clock synchronization.

The detector-transmitter or detector-transmitters of the first receivers may thus be used at the same time as a waiting element, particularly if the polarization in which they detect the photons is adjustable and can therefore be adjusted to the polarization used by the waiting element in order to absorb the photons.

Antinoise Device

Optical amplifiers have a tendency to emit photons in the opposite direction to the propagation signal, either during the amplification of the signal or in the absence of a signal, after molecules or atoms of the amplifier medium have been excited by a pump signal.

The second receiver comprises, for example, a switch arranged in front of the optical amplifier in order to limit the number of photons emitted by the amplifier toward the entangled photon source of the device.

The switch of the second receiver is, for example, configured in order to absorb or reflect the photon or photons subsequent to a first photon reaching said second receiver in a predetermined time interval.

The switch of the second receiver may be connected to the measuring instrument of the second receiver in order to allow light to pass through only in one direction or the other after a first photon has arrived and until the next photon is expected, or a predetermined time before this moment, for example one half of the resting period defined above.

Alternatively, the switch of the second receiver may allow photons to pass through only during the periods in which they are expected, in particular during the processing time intervals of the aforementioned photons.

Assignment of the Photons to the Information without a Synchronized Clock Using Optical Transmission Means with Low Transparency Optical fibers, although transparent, do not transmit all the photons presented at their entry. A loss of 0.20 dB per kilometer is common, losing for example 10 dB, i.e. 90% of the photons, in 50 km.

The effect of the photons lost in transit between the emitter and the first receiver is, however, different from the effect of the loss of the photons lost while traveling toward the second receiver; the entangled photons of the photons lost between the emitter and the first receiver being capable of arriving at the second receiver with any polarization corresponding to the polarization of the entangled photon absorbed in the line going toward the first receiver, while the loss of a photon in the line leading to the second receiver necessarily causes the disappearance of a photon potentially carrying information, that is to say one whose entangled photon has reached the first receiver.

Furthermore, the polarizations of the photons arriving at the second receiver after their entangled photons have been absorbed in transit toward the first receiver are not necessarily equidistributed among all possible observable polarizations.

For the transmission of information, pairs of complementary polarizations are preferably used for which corresponding polarizations observed at the second receiver are less numerous when the entangled photon of the photon detected at the second receiver has been absorbed during its transit toward the first receiver.

The invention furthermore relates to a method for calibrating a system as defined above, making it possible to determine two Jones matrices, one of which makes it possible to calculate the polarization of a photon arriving at the second receiver as a function of the polarization of a photon absorbed at the first receiver, wherein, preferably, the quantity of different polarizations observable at the second receiver is more than two times the inverse of the ratio of transmission of photons between the emitter and the first receiver, the method consisting in:

configuring the complex absorber of the first receiver in order to absorb the photons received at the first receiver in one of two complementary polarizations of a pair of absorption polarizations, successively generating a plurality of pairs of entangled photons from an emitter, the first photon of the pair being emitted toward a first receiver and the second photon being emitted simultaneously toward a second receiver, the first and second photons being entangled in terms of their polarization state, for each polarization in which a photon is received at the second receiver, counting the number of photons that have reached said second receiver with this same polarization, stopping sending the photons when a predetermined number of photons has been received at the second receiver, determining the two polarizations in which the photons have been received most often at the second receiver, these polarizations being considered as the polarizations corresponding to the absorption polarizations of the photons at the first receiver, calculating the two possible Jones matrices of transformation of the polarizations, making it possible to deduce the polarization of a photon received at the second receiver from the polarization of a photon received at the first receiver.

Recording the polarization of at least one photon received at the first receiver and that of its entangled photon received at the second receiver, the correspondence being made for example by using their respective reception times, furthermore makes it possible to be able to select from the two calculated Jones matrices the one which makes it possible to calculate the polarization of the photons received at the second receiver as a function of the polarization of their entangled photons possibly received at the first receiver.

The following method may furthermore be used in order to transmit items of information from the first receiver to the second receiver, the method comprising the steps consisting in:

successively generating a plurality of pairs of entangled photons from an emitter, the first photon of the pair being emitted toward a first receiver and the second photon being emitted simultaneously toward a second receiver, the first and second photons being entangled in terms of their polarization state, for each item of information to be transmitted, configuring the complex absorber of the first receiver in order to absorb a number NPT of transmission photons in a predetermined pair of complementary polarizations, referred to as the "absorption polarization pair", corresponding to the item of information to be transmitted, then, if the next item of information to be transmitted is not already known or is the same as the item of information just transmitted, configuring the absorber in a pair of polarizations referred to as a "waiting polarization pair", and if said item of information is the same as the item of information which has just been transmitted, counting at least NPT photons absorbed in this "waiting polarization pair", at the second receiver, for each pair of complementary polarizations, counting the number of photons received in one of the two polarizations of said polarizations since the last possible reception of a signal. As soon as the counter exceeds a predetermined threshold number NSP for one of the pairs and the pair of complementary polarizations is different to that of the last signal received, considering the item of information corresponding to this pair of polarizations as a new signal, and if this last item of information does not correspond to the waiting polarization pair, adding this item of information to the list of received items of information.

Alternatively, at the first receiver, the polarization absorber is systematically configured in order to absorb at least NPT photons in one of the two waiting polarizations after sending any information.

For example, the following will be used in order to transmit an item of information:

transmission lines between the emitter and each of the receivers having an attenuation of 10 dB, i.e. a loss of 90% of the photons, transmission lines between the complex absorber which are configured in order to absorb the photons in 450 pairs of complementary polarizations, these pairs representing 80% of the photons received at the second receiver in the event of absorption of their entangled photons in their transits toward the first receiver, 200 photons may be selected for NPT and 6 for NSP, which according to calculations by the inventor makes it possible to obtain a transmission error ratio that is then less than 1 in 10 000.

In another example, with an error ratio of 97% corresponding to attenuation of the signal by 15 dB, by using 450 pairs of complementary polarizations, each polarization and phase shift being separated from one another by about 5°, the encoding of 1200 photons at the first receiver (that is to say NPT=1200) and the threshold number NSP being fixed at 14, according to calculations by the inventor, makes it possible to obtain an error ratio of less than 1 in 150 000 if the photons resulting at the second receiver from photons absorbed during their transits toward the first receiver are equidistributed over all the observable polarizations.

Treatment of Pairs of Photons Sent Simultaneously

The emitter may sometimes send pairs of entangled photons very close together. The photon detectors located at the first receiver therefore preferably count the number of photons absorbed, and not just the number of photon impacts on said first receiver. This counting makes it possible, for example, to take into account the intensity of the electromagnetic wave impinging on the photon detectors.

Groups of photons may thus arrive almost simultaneously at the second receiver, the latter not being capable of distinguishing the polarizations of the photons from one another. The polarization detector being capable of detecting an average polarization of all the photons detected "simultaneously", the polarization of the groups of photons arriving simultaneously at the second receiver, that is to say whose generated light intensity is for example greater by 50% than the intensity generated by a single photon, advantageously does not give rise to incrementation of the counters of photons received in diverse polarizations. It may, however, sometimes be that a plurality of photons reach the first receiver but only one of their entangled photons reaches the second receiver, and this is then counted.

Performance of the Device

The use of lines without loss or with low losses between the emitter and the first receiver, for example allowing the photons to travel in a vacuum, makes it possible to reduce or avoid the photons received at the second detector with a random polarization.

Likewise, the use of precise measuring instruments at the second receiver, making it possible either to increase the number of pairs of complementary polarizations or to ignore a large number of photons with random polarizations, may make it possible to:

increase the transmission distance of the photons, increase the baud rate by reducing the number of transmission photons NPT.

An increased switching speed of the polarization of the complex absorber of the first receiver makes it possible to increase the sending frequency of the entangled photons sent by the emitter.

An increased temporal accuracy of the polarization detectors of the second receiver, which makes it possible to distinguish the parasitism of diverse photons received very close together in time, also makes it possible to use a higher flux of entangled photons but also to reduce the number of receptions of photons received "simultaneously", as described above.

This method has the advantage of requiring neither the placement of a switch at the emitter in order to restrict the emissions of entangled photons, nor clock synchronization.

Return Treatment of the Photons Toward the Emitter

Photons are sometimes reflected toward the emitter from the receivers. In order to prevent them from being reflected back by the emitter toward one of the receivers, the cavity or the material in which the entangled photons are produced by wave mixing, the refractive index of which is nonlinear, is preferably surrounded or covered with a material which absorbs light with a wavelength equal to that of the entangled photons.

Quantum Communication Methods

The invention furthermore relates to a quantum communication method using the system defined above, comprising the steps consisting in:

generating a pair of entangled photons from an emitter, the first photon of the pair being emitted toward a first receiver and the second photon of the pair being emitted simultaneously toward a second receiver, the first and second photons being entangled, the second receiver being located on the propagation path of the second photon further away from the emitter than the first receiver, so that it arrives there later, by using a polarization modifier, modifying the polarization state of the first photon when it reaches the first receiver into a polarization state dependent on the information to be transmitted, the state being selected from among at least two different pairs of complementary absorption polarizations, with the exception of exactly two pairs of perpendicular linear polarizations in which the polarization directions of one of the pairs are at 45° to the polarization directions of the other pair, by using an absorption instrument, absorbing the first photon in one of the two complementary polarizations of the selected pair, at the second receiver, duplicating the second photon to form a flux of multiplied photons by using an amplification device, the light that is created having preserved the polarization state of the second photon, measuring the average polarization state of the light flux and determining according to this measurement the polarization state of the first photon, in order to deduce therefrom the information transmitted by the first receiver.

The pair of complementary photons is preferably selected from among at least three different pairs of complementary polarizations.

The pair of complementary polarizations is for example selected from among 210 distinct pairs of absorption polarizations, in particular from among polarizations spaced apart by 9° in their polarization direction and phase-shifted by 9°.

The invention furthermore relates to a quantum communication method using the system defined above, comprising the steps consisting in:

generating a pair of entangled photons from an emitter, the first photon of the pair being emitted toward a first receiver and the second photon of the pair being emitted simultaneously toward a second receiver, the first and second photons being entangled, the second receiver being located on the propagation path of the second photon further away from the emitter than the first receiver, so that it arrives there later, according to the information to be transmitted, selecting to absorb or not absorb the first photon in one of two pairs of complementary polarizations when it reaches the first receiver, by using an optical selector which does or does not direct said photon toward an instrument or toward a plurality of instruments, in the event that the selection is made not to absorb the photon in a predefined polarization, trapping said first photon in a protection device making it possible to avoid its absorption at least so long as the second photon has not reached the second receiver, at the second receiver, duplicating the second photon to form a flux of multiplied photons by using an amplification device, each multiplied photon having preserved the quantum state of the second photon, measuring the average quantum state of the flux of multiplied photons and determining according to this measurement whether the first photon has been absorbed at the first receiver, and/or with which instrument, in order to deduce therefrom the information transmitted by the first receiver.

Preferably, the polarization of the pair of entangled photons is indeterminate in the observable basis or bases, in which the instruments of the first receiver absorb them.

For example, the pair of entangled photons reaches the receivers with a linear entangled polarization, one of the two complementary absorption polarizations being circular, the second receiver being arranged in order to distinguish whether the average polarization of the flux of multiplied photons is circular or linear, and to determine according to this distinction whether or not the first photon has been measured.

As a variant, the pair of entangled photons reaches the receivers with a circular entangled polarization, the quantum state measured at the first receiver being a linear polarization, the second receiver being arranged in order to distinguish whether the average polarization of the flux of multiplied photons is circular or linear, and to determine according to this distinction whether or not the first photon has been measured.

As a variant, the pair of entangled photons reaches the receivers with a vertical or horizontal linear polarization, the quantum state measured at the first receiver being a linear polarization at 45° or −45° to the vertical or the horizontal, the second receiver being arranged in order to distinguish whether the average linear polarization of the flux of multiplied photons (P20) is at 45° or −45°, or the vertical or the horizontal, and to determine according to this distinction whether or not the first photon has been measured.

Transmission of Information

The system according to the invention and the quantum communication method described above make it possible to transmit items of information either of the binary type, in the form of bits, or discrete or continuous values between the first and the second receiver.

Preferably, a plurality of pairs of entangled photons are generated successively by the emitter, each pair of photons making it possible to transmit an item of information, for example of the binary type, from the first receiver to the second receiver.

For example, the selection may be made to absorb the first photon at the first receiver in order to transmit a bit 1 and reflect it in order to transmit a bit 0. Measurement at the second receiver of the average quantum state of the flux of multiplied photons then makes it possible to determine whether a bit 1 or a bit 0 is being transmitted from the first receiver quasi-instantaneously.

Several methods may be implemented in order to secure the communication and avoid transmission errors, for example due to double pairs of photons emitted simultaneously.

For example, during time intervals established beforehand by using the clocks described above, only the first photon reaching a receiver is preferably considered, the subsequent photons being ignored.

As described above, the photons may be counted when they arrive at a polarization detector. If the counting reveals the arrival of more than one photon during a predefined time interval, the bit is not transmitted during this interval, and it is for example transmitted in the next time interval, or, preferably, the same bit is retransmitted again.

At the second receiver, counting the photons arriving in the time interval in which they are expected may advantageously make it possible to create a temporary list of unreceived bits.

Bidirectional Communication

In order to allow bidirectional communication, that is to say in order to allow each of the two receivers to transmit information to the other receiver, a plurality of emitters may be used.

The system according to the invention may, in particular, comprise a second emitter capable of generating one or more pairs of entangled photons, the second emitter being located closer to the second receiver than to the first receiver.

As a variant, at least some of the photons may be made to travel an indirect path so as to lengthen their transport time toward one of the receivers, for example by having the photons reflected on one or more intermediate mirrors or having them pass through media with high refractive indices, or alternatively by transporting them in optical fibers with varied lengths.

This lengthened journey may for example alternate, at a rate which is fixed or variable as a function of requirements, with the unlengthened journey so as to be able to use the entangled photons sometimes in order to transmit the information from one point to another, and sometimes in the other direction. Optical switches located upstream of the receivers and synchronized with the switch attached to the emitter, making it possible to send the photons on a lengthened path, may be installed in order to send said photons toward receivers of the first receiver type, as described above, or conversely of the second receiver type.

Method of transmitting a key and of verifying that this transmission is not being eavesdropped.

It is possible to verify that an item of information transmitted by a flux of photons from the emitter to the second receiver has not been eavesdropped by implementing the following steps:

the second receiver establishes a first list of the reception dates of the photons that conveyed the item of information, and the relative polarization designating that of the two complementary polarizations in which each photon was received;

the second receiver generates a message containing the list collected in the preceding step, creates an electronic signature of this list and transmits said list and the signature to the receiver;

the first receiver receives the list and signature then verifies said signature;

the first receiver makes a second list consisting of elements of the first list for which the relative polarizations of the photons received by the first and second receivers are equal, or indeed for which the entangled photon never reached the first receiver, two entangled photons having different relative polarizations;

if the number of elements of the second list restricted to pairs of entangled photons each of the two photons of which reached their respective receivers is lower than the product of a predetermined ratio multiplied by the count of the elements of the first list restricted to pairs of entangled photons each of the two photons of which reached their respective receivers, then the item of information is declared to have been transmitted without having been eavesdropped.

The following steps may then be carried out:

if the item of information is declared to have been transmitted without having been eavesdropped, then the second list is sent signed by the first receiver to the second receiver, then a third list is created by the first receiver, this list consisting of the relative polarizations of the photons featuring in the first list but not featuring in the second list, on reception of the second list by the second receiver and after verification of the signature, the third list is recreated in the second receiver using the first and second lists, then a signed message, confirming successful receipt of the second list, is sent by the second receiver to the first receiver; and the second receiver uses the third list as shared key with the first receiver, and, on reception by the first receiver of the message transmitted by the second receiver in the preceding step, the first receiver uses the third list as shared key in exchanges with the second receiver.

A polarizing filter may be placed upstream of the second receiver.

BRIEF DESCRIPTION OF THE DRAWINGS

The invention will be understandable more clearly on reading the following detailed description of nonlimiting exemplary embodiments thereof, and on studying the appended drawing in which:

FIG. 1A partially and schematically represents a quantum communication system according to the invention, FIG. 1B partially and schematically represents another quantum communication system according to the invention, FIG. 2A partially and schematically represents a linearly polarized photon, FIG. 2B partially and schematically represents a circularly polarized photon, FIG. 3 partially and schematically represents details of the transmission of photons from the emitter to the receivers, FIG. 4A partially and schematically represents an example of an optical selector according to the invention, FIG. 4B partially and schematically represents a variant of the selector of FIG. 4A, FIG. 4C partially and schematically represents another example of an optical selector according to the invention, FIG. 5A FIG. 5B FIG. 5A and FIG. 5B schematically represent an example of a polarization direction modifier, comprising quarter-wave plates, FIG. 5C FIG. 5B schematically represents another example of a polarization direction modifier, comprising a chiral material, FIG. 6 schematically represents an example of a polarization phase modifier, FIG. 7 partially and schematically represents an example of an instrument for absorbing a linearly polarized photon, FIG. 8 partially and schematically represents another example of an instrument for absorbing a linearly polarized photon, FIG. 9 partially and schematically represents an example of a receiver of the second photon, comprising a doped-fiber amplifier, FIG. 10A partially and schematically represents an example of a measuring instrument of the second receiver, comprising a succession of semireflective plates, FIG. 10B partially and schematically represents an example of a Young's interferometer used for the measuring instrument of the second receiver, FIG. 11A is a block diagram partially illustrating an example of the operation of a quantum communication system in order to transmit a bit 0, FIG. 11B is a block diagram partially illustrating an example of the operation of a quantum communication system in order to transmit a bit 1, FIG. 12 is a block diagram partially illustrating an example of the operation of a quantum communication system in order to transmit a series of discrete values, FIG. 13 is a block diagram partially illustrating an example of a method for timestamping the arrival of a photon in a receiver, FIG. 14 partially and schematically illustrates the possibility of placing an "antinoise" device in front of the amplifier, FIG. 15 partially and schematically represents the possibility of using the system according to the invention in order to establish bidirectional communication between two locations, and FIG. 16 illustrates a variant of implementation of the invention.

DETAILED DESCRIPTION

Figure 1A:
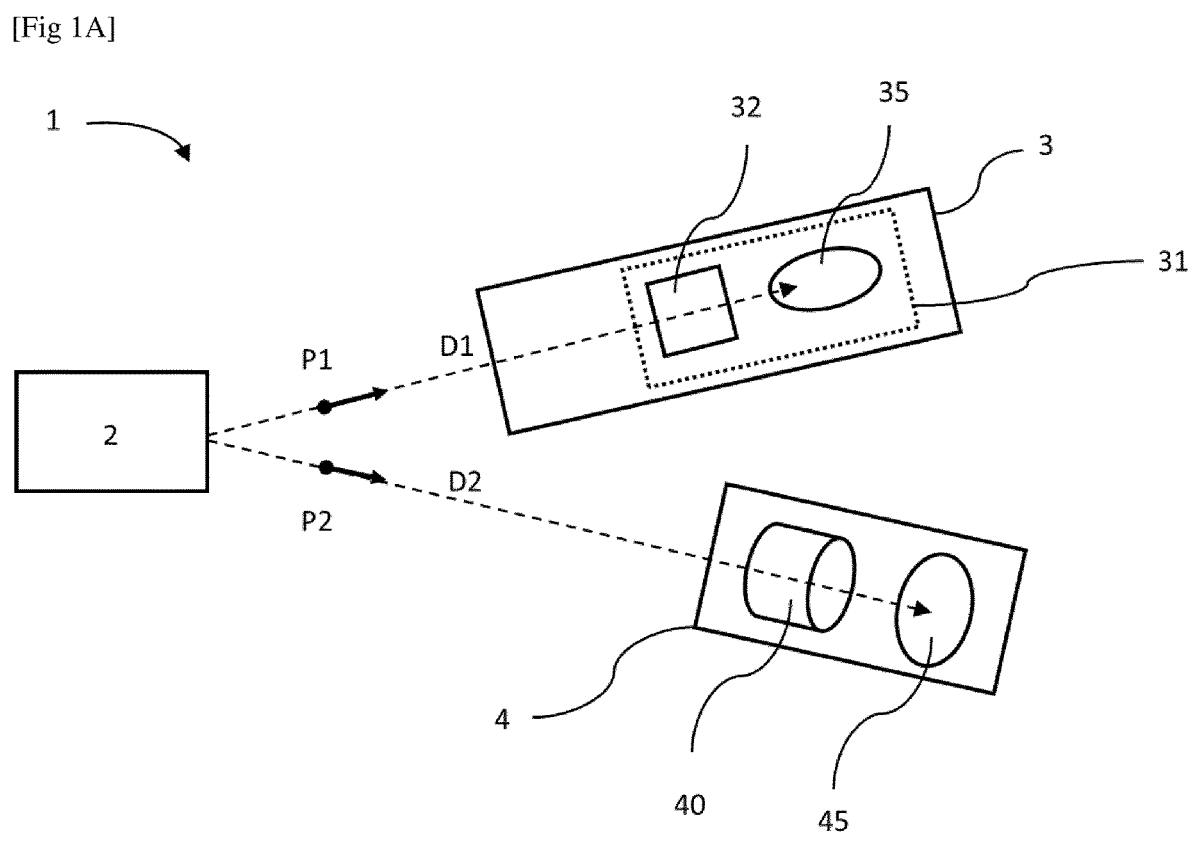

FIG. 1A illustrates a quantum communication system 1 according to the invention. The system comprises an emitter 2 emitting a pair of entangled photons (P1, P2), the first photon P1 propagating on a propagation path D1 and the second photon D2 propagating on a propagation path D2 different to the path D1. The photons P1 and P2 are emitted simultaneously.

Because of the nature of light and the wave-particle duality of a photon, the terms "wave", "photon" and "particle" are used interchangeably below in order to denote the product emitted by the emitter 2.

The terms "measuring instrument" and "absorption instrument" are used interchangeably to denote an instrument that absorbs a photon according to a certain polarization.

The system 1 comprises a first receiver 3, located on the propagation path D1 of the first photon P1, and a second receiver 4 located on the propagation path D2 of the second photon P2.

The receiver 3 is closer to the emitter 2 than the receiver 4 is, so that the photon P1 reaches it before the photon P2 reaches the receiver 4.

In the example considered, the receiver 3 comprises a complex absorber 31 comprising a polarization modifier 32 and an absorption instrument 35.

The complex absorber 31 is configured in order to absorb the photon in a polarization state selected from among a plurality of pairs of different complementary polarizations, preferably at least three pairs.

The polarization modifier 31 is configured in order to transmit the photon P1 according to the selected pair of complementary polarizations, and the absorption instrument 35 makes it possible to determine which of the two states of the pair the photon P1 is in. Before entering the absorption instrument 35, the polarization state of the photon P1 is a superposition of the two states of the selected pair, weighted with certain probabilities, for example equiprobably.

FIG. 1B illustrates another example of a quantum communication system 1 according to the invention. In this example, the receiver 3 comprises two measuring instruments 35 arranged in order to measure the quantum state of the first photon P1, and an optical selector 30 arranged upstream of the measuring instruments 35 and configured in order to send the first photon P1 either toward a birefringent prism 36 which leads the photon, depending on the linear direction of its polarization, on paths D1' or D1" then toward one or other of the measuring instruments 35, or prevents it from being measured, for example by reflecting it onto a propagation path D3 different to the path D1.

The direction D3 is, in particular, selected in such a way that the photon P1 is not absorbed before its entangled photon is multiplied at the second receiver 4.

The system 1 preferably comprises, as illustrated, a device 5 for protecting the quantum state of a photon, which is arranged in proximity to the receiver 3, in particular on the propagation path D3 in the example considered.

This device makes it possible, for example, to "trap" the photon P1 in the event that it is reflected by the optical selector 30 onto the path D3, for example in order to prevent it from being measured or absorbed at least until the second photon P2 has reached the second receiver 4. A 5D photon detector (not represented) may be placed at the end of the device 5 in order to detect the photons which have been captured therein, after their entangled photons have reached the second receiver.

The second receiver 4 comprises an optical amplifier 40 making it possible to multiply the second photon P2 while preserving its polarization, and a measuring instrument 45 making it possible to measure the average polarization of the multiplied photons.

The transmission of the photons P1 and P2 may take place in various ways, and in various media. The photons propagate, for example, in an optical fiber or a waveguide, or freely in space, the space being empty or filled with a gas.

The photons may pass through a plurality of media having different refractive indices. For example, antireflection plates may be inserted between two media being passed through, as appropriate, in order to prevent undesired optical phenomena, in particular Fresnel reflection of the waves emitted by the emitter 2.

The emitter 2 comprises, for example, one or more lenses selected with a sufficient size for the photons to reach their respective receiver with little diffraction, for example allowing at least 99.99% of the emitted wave to reach the receiver.

The emitter 2 may furthermore comprise a system, in particular an electronic device, making it possible to adjust the initial directions in which the photons P1 and P2 are respectively emitted.

The adjustment may, in particular, take account of the different refractive indices of the media passed through, and the modification of the trajectory of the photons which may result therefrom, for example for a photon emitted from space which enters the atmosphere.

The wavelength of the emitted wave is, for example, selected according to the medium or media to be passed through; for example, photons in the infrared range will preferably be used when they have to transit through the atmosphere or air.

The emitter 2 generates, for example, pairs of entangled photons by using the method of spontaneous parametric down-conversion (SPDC). The emitter 2 is, for example, configured in order to emit on average less than one pair per unit time, for example one pair per nanosecond, which corresponds to a photon transmission frequency of 1 GHz.

When they are emitted, the photons P are for example linearly polarized, that is to say the corresponding electromagnetic wave has an electric field whose direction is perpendicular to its propagation direction D. As appropriate, the polarization of the photons may be vertical V or horizontal H, as illustrated in FIG. 2A.

The quantum state corresponding to the polarization of the photons is sometimes indeterminate so long as it has not been measured or absorbed. Before being measured, the quantum state of the photon is therefore sometimes considered as the superposition of the possible states, namely in the example considered as the superposition of a polarization at an angle of 45° and a polarization at an angle of −45°.

In the variant illustrated in FIG. 2B, photons P are circularly polarized when they are emitted, that is to say the direction of the corresponding electric field changes in a rotational movement while its norm remains constant.

As appropriate, the polarization of the photons is defined by the sense of rotation of the electric field, either a clockwise sense C1 or a counterclockwise sense C2. Before being measured, linearly polarized photons are in an indeterminate quantum state considered as the superposition of two circular polarization states with opposite rotation senses.

In certain cases, two quarter-wave plates 6 and 8 may be introduced on the propagation paths of the photons, between the emitter 2 and the receivers 3 and/or 4, as illustrated in FIG. 3.

Depending on its orientation, the plate 6 converts for example the linear polarization of a photon into circular polarization by advancing or retarding the electromagnetic waves propagating along an axis perpendicular to the ordinary axis of the crystal with an electric field perpendicular to the same axis, with respect to the wave having an electric field parallel to said ordinary axis.

The photons emerging from the plate 6 are, for example, transmitted by an optical fiber 7 toward another quarter-wave plate, which converts the circularly polarized fields into linearly polarized fields, before propagating toward the receiver 3 or 4.

This conversion of the polarization of the emitted photons makes it possible, in particular, not to have to take the direction of the polarization of the photons emitted by the emitter into consideration at the receivers.

The optical selector 30 may be produced in various ways, some examples of which are illustrated in FIGS. 4A to 4D.

The optical selector 30 comprises, for example, a controlled liquid-crystal mirror as illustrated in FIG. 4A, comprising a plate 310 enclosing liquid crystals. For example, electrodes 315 and 320 are placed on opposite sides of the plate 310 in order to subject the liquid crystals to an electric field, making it possible to control its refractive index $n_C$.

Depending on the refractive index $n_C$, the incident photon P1 may be reflected onto a propagation path D3, or it may pass through the plate 310 and be transmitted on a propagation path D1', which may be identical or different to the path D1, toward the measuring instrument 35.

Figures 4B, 4C:
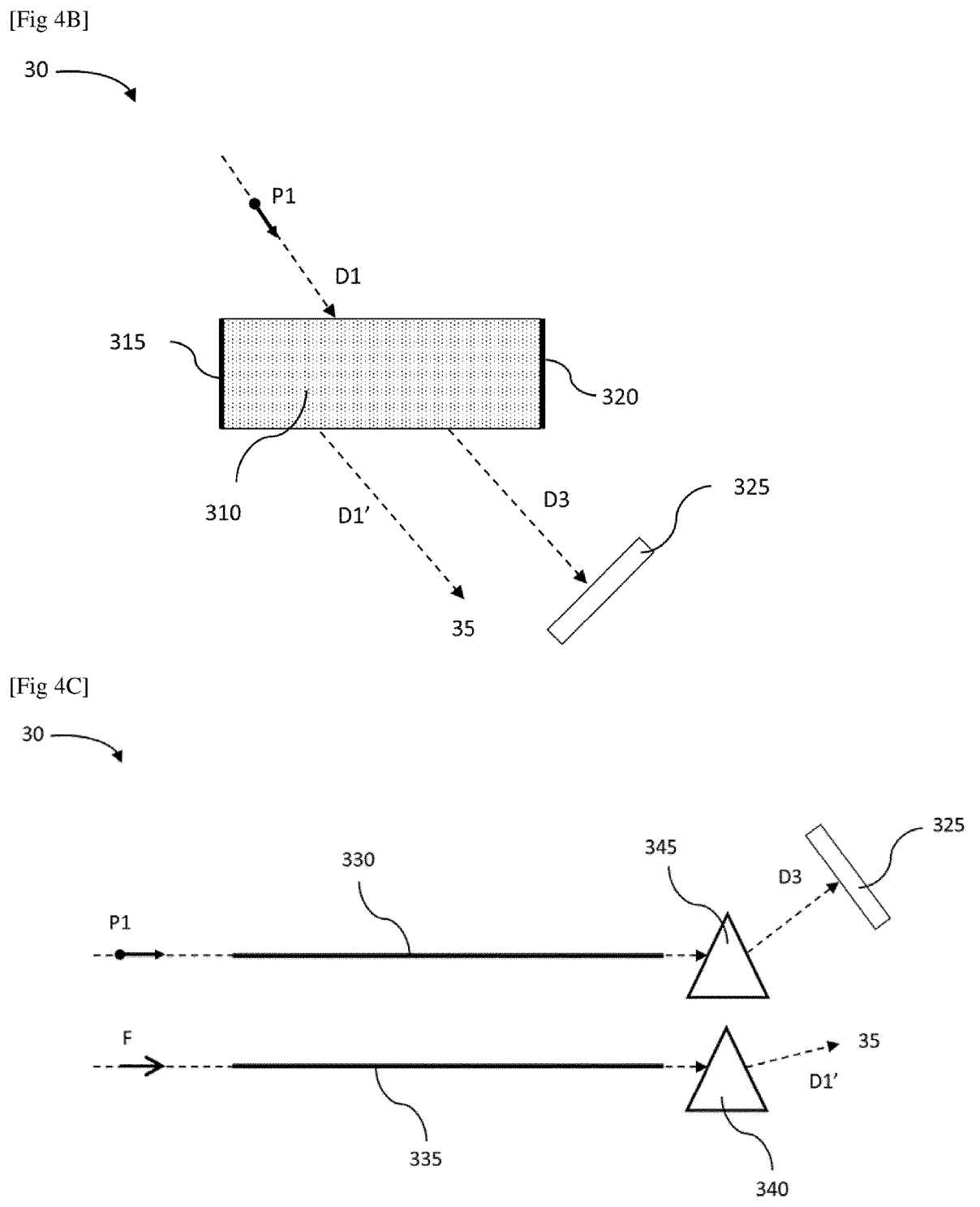

In a variant which is illustrated in FIG. 4B, the photon P1 passes through the liquid-crystal plate 310 and emerges along D3 or D1', the directions D1, D1' and D3 being parallel in the example considered.

A mirror 325, in particular a Bragg mirror, may be placed on the propagation axis D3 in order to reflect the photon in another direction, for example toward the protection device 5.

Antireflection plates may advantageously be placed on each of the faces of the plate 310 and adjusted according to the entry and exit angles of the photon when the latter passes through it.

In the variant illustrated in FIG. 4C, the optical selector 30 is a mirror controlled by nonlinear fibers. It comprises two optical fibers 330 and 335. The fiber 335 is, for example, formed from a nonlinear material.

On its arrival at the first receiver, the first photon P1 enters the fiber 330. The selection may be made to illuminate the fiber 335 simultaneously with a light signal F, also referred to as a "control signal".

The signal F is a high-intensity light wave, for example emitted by a laser, with a wavelength different to that of the photon P1.

If the fiber 335 is illuminated by the signal F, the photon P1 remains in the fiber 330 before, for example, passing at the fiber exit through a prism 345 arranged on a propagation path D3. In a similar way to that which has been described above, a mirror 325, in particular a Bragg mirror, may be placed on the propagation axis D3 in order to reflect the photon in a desired direction, for example toward the protection device 5, or straight back into the fiber 330.

If the fiber 335 is not illuminated by the signal F, the photon P1 is transmitted from the fiber 330 to the fiber 335. The photon P1 emerges from the fiber 335 and, for example, passes through a prism 340 before being transmitted toward the measuring instrument 35, for example. The prism 340 preferably consists of a dispersive material allowing the illumination light to be made to emerge through a different location and in a direction different to that of the photon. A Bragg mirror (not represented) that returns only said illumination light and allows the photon to pass through may be placed between the fiber 335 and the prism 340, for example in order to reflect said illumination light in a direction other than toward the prism 340, or even into the fiber.

Antireflection plates (not represented) may be placed at the entry and exit of the prisms 340 and 345 and adjusted to the wavelength of the photon P1.

Various ways of producing the polarization modifier 32 of the system of FIG. 1B will now be described.

The polarization modifier 32 preferably comprises a polarization direction modifier 32a arranged upstream of a phase modifier 32b.

In a first exemplary embodiment of polarization direction modification, the polarization direction modifier 32a comprises a stack of plates 510, in particular quarter-wave plates, orientated differently with respect to one another, as illustrated in FIG. 5A, so that a circular wave 508 entering one of these quarter-wave plates emerges as a wave 511 polarized linearly along a direction associated with said plate.

These plates may be designed in order to operate with waves 508 that enter them with a direction parallel to the bisector of their edges 521 and 522. These plates are preferably composed of uniaxial birefringent crystals, for example rutile. This birefringent crystal may form their entire mass or may be concentrated on a slice, for example on one of the edges 523 through which the wave 508 passes, as illustrated in FIG. 5A.

These plates may be juxtaposed with one another and form a structure 524, as illustrated in FIG. 5B, so that the emerging waves 511 or 512 have a linear polarization whose electric field direction depends on the place of entry into the assembly 524 of two waves 508 or 509 polarized circularly and with a direction parallel to the bisector of the edges 521 and 522.

Thus, a wave 505 with a determined direction and linear polarization entering the quarter-wave plate 501 passes through it along the direction 507 and becomes circularly polarized therein before entering a crystal 502 whose refractive index is adjustable, for example under the effect of an electric field generated by electrodes 516, then preferably enters another crystal 503 whose refractive index is also adjustable, for example under the effect of an electric field generated by electrodes 517, which generate an electric field perpendicular to the field generated by the electrodes 516.

Circularly polarized waves 508 and 509 then emerge from the crystal 503 and enter the assembly 524 at different places according to the selection of the refractive index imposed on the crystal 503. The direction of the light ray being different depending on these places, the direction of the edges 520 and 521 is preferably different for each element 510 of the assembly 524.

On the diagram illustrated in FIG. 5B, the waves 511 and 512 are therefore two possibilities for the light ray to pass through the assembly 524. These waves emerge from the assembly 524 polarized linearly along different directions and having the same propagation direction, but at different places on the border 514 of the assembly 524. They enter another crystal 504, the refractive index of which is electrically adjustable by electrodes 518, then preferably yet another crystal 505, the refractive index of which is also adjustable by electrodes 519, which create an electric field perpendicular to the field created by the electrodes 518, the voltages of which are adjusted as a function of the refractive index selected for the crystals 502 and 503 so that all the light waves emerge from the crystal 505 as a wave 513 with the same direction at the same location 515.

The crystals 502 503, 504 and 505 are, for example, Merck E7 liquid crystals, at the terminals of which the electrodes apply voltages of between 0 and 5000 V, for example, if the distance between the electrodes of each of the pairs is 5 mm, making it possible to vary their refractive indices between 1.5 and 1.67. The electrodes are preferably covered with a dielectric film. These refractive indices modified by the electric fields may be different depending on the relative direction of the electric field of the light and the direction of the electric field, the application of successive perpendicular electrical voltages making it possible to modify the refractive index for each of the two components of said light, the latter being the superposition of the waves whose electric field is perpendicular to FIG. 5B and of the waves whose electric field is perpendicular to the propagation direction and in the plane of the figure.

In a second exemplary embodiment (not represented) of the modification of the polarization direction, the wave polarized linearly along a determined direction enters a first quarter-wave plate which converts its polarization into circular polarization, then a second quarter-wave plate which converts this circular polarization into a linear polarization along an adjustable direction dependent on the orientation of this second quarter-wave plate. The orientation of the second quarter-wave plate is obtained, for example, by mechanical slaving to a sensor or to an electrically regulated device making it possible to rotate it, for example by friction on an axle set in movement by a piezoelectric material or by an electric motor device, for example operating with direct current.

In a third example, illustrated in FIG. 5C, liquid crystals are used in order to control the rotation of the linear electric field of the incident photons 526 polarized linearly along the same polarization direction, which start for example by passing, preferably perpendicularly, through one of two transparent 0.2 μm electrodes 527 which is coated on one of its faces 528 with a material that orientates the liquid-crystal particles 529 adjacent to said face 527 in the direction of the polarization of the incident photons 526, then passing through the liquid-crystal 529 over 2 μm before passing through the second transparent electrode 527 whose face 528, preferably parallel to the first electrode, is also coated with a material making it possible to align the liquid crystals but in a direction perpendicular to the direction imposed by the coating of the first electrode. The direction of the liquid crystals between the two electrodes is thus gradually modified from 0° to, for example, 60° with respect to their initial orientation. The application of an electrical voltage between, for example, 0 and 1 V gradually reorientates the liquid crystals in order to impose on them a direction in the axis of the propagation direction of the photons, thus gradually reducing the refractive index difference of the liquid crystals between the two polarizations perpendicular to the movement of the photons and the rotating power of the device. This device therefore makes it possible to select the exit direction of the polarization of the incident photon continuously between 0 and 60°.

Devices such as the one illustrated in FIG. 5B are advantageously used in a device similar to the one described above and illustrated in FIG. 5A, for example placed between the plates 524 and 504, each of for example 4 elements 510 making it possible to place the linear polarization of an incident photon in one of four precise directions, for example −90°, −45°, 0° and +45°, then each of the subsequently placed devices described in FIG. 5B, which are preferably aligned with the propagation direction of the photons emerging from the devices 510 that precede them, making it possible to add a rotation by any angle between, for example, 0 and 45° to this rotation.

FIG. 6 illustrates a polarization phase modifier 32$b$ according to the invention. The phase modifier 32$b$ comprises a first birefringent plate or prism 310 arranged in order to split the incident photon P1 with a polarization field E into two electromagnetic waves with a linear polarization $E_1$ and $E_2$ on two different axes $x_1$ and $x_2$.

A retardation plate 321 with a variable refractive index, for example comprising a Pockels cell such as lithium niobate, regulated by electrodes 322 or a nonlinear material, is arranged on the second axis $x_2$ so as to make the wave $E_2$ orientated along the second axis $x_2$ acquire a predetermined phase shift with respect to the wave $E_1$ orientated along the second axis $x_1$.

Another birefringent plate 310, for example consisting of paratellurite, is arranged at the exit of the phase modifier 32$b$, making it possible to combine on the same axis x the two waves whose polarization fields $E_1$ and $E_2$ are perpendicular into one wave or photon P1 with a field E' that has acquired a phase shift with respect to the field E. Alternatively, in order to profit from the different modification of the refractive index of the crystal according to the direction of the electric field of the light relative to the direction of the electric field modifying the refractive index, a simple Pockels cell 321 may be used with the electrodes 322 but without the plates 310.

The measuring instruments 35 of the first receiver 3 may be of varied types and comprise various elements. The latter depend, in particular, on the nature of the polarization of the photon P1 when it is emitted by the emitter 2. Some examples are illustrated in FIGS. 7 and 8 and described below.

In the example illustrated in FIG. 7, the measuring instrument 35 comprises a polarizing filter 350 arranged on the propagation path D1 of the photon P1 and a photon detector 355 arranged on the same propagation path, downstream of the filter 350.

The polarizing filter 350 allows only the photons that have a certain linear polarization to pass through, and absorbs those whose polarization is perpendicular thereto. It therefore makes it possible to select the photons having a linear polarization with a certain direction.

In the example considered, the polarizing filter 350 is a grille formed by vertical wires, for example metal wires. It allows only the photons that have a horizontal linear polarization H to pass through.

In one variant, illustrated in FIG. 8, the measuring instrument 35 comprises an anisotropic panel 360, for example a birefringent plate, a birefringent prism or two birefringent prisms attached to one another. The panel is, for example, made of beta barium borate ($BaB_2O_4$, BBO).

The photon P1 whose quantum state is intended to be measured reaches the panel 360 on an incident propagation path D1 and is transmitted on one of two propagation paths D11 or D12, depending for example on whether its polarization is in the plane of the plate 360 (that is to say perpendicular to the plane of FIG. 8) or normal to the plane of the plate 360.

The measuring instrument 35 furthermore comprises two detectors 355, each placed on a propagation path D11 or D12 of the photon P1.

In this example, and in contrast to a polarizing filter, all the photons can be detected by the detectors 355, regardless of their polarization.

In some embodiments, a quarter-wave plate is placed upstream of the anisotropic plate 360 in order to convert a circular polarization of a photon into a linear polarization, and thus to detect the sense of the rotation of a circularly polarized photon.

The second receiver 4 may comprise various types of optical amplifier 40 and measuring instrument 45.

For example, a doped-fiber amplifier as illustrated in FIG. 9 is used.

In this example, the amplifier 40 comprises a fiber 400, in particular a fiber made of nonlinear material, into which the second photon P2 is introduced after having passed through a dichroic prism 401 when it reaches the receiver 4.

A control electromagnetic wave F used to supply energy and multiply the photon P2 is introduced through a fiber 410 into the same dichroic prism 401 at a point and with a direction such that it emerges from the fiber 400 just like the photon P2, the photon P2 and the control wave F having different wavelengths.

The control wave F preferably has a high luminous intensity and preferably a wavelength shorter than that of the photon P2.

While it is passing through the fiber 400, and under the effect of the light flux F, the photon P2 is multiplied into N photons P20, then these N photons and the flux F pass through a second dichroic prism 402 from which they emerge in different directions. The N photons are then advantageously directed toward a measuring instrument 45 making it possible to determine the polarization of the light flux, exemplary embodiments of which are given in FIGS. 10A and 10B.

The information transmitted by the first receiver can be deduced from the measurements of the measuring instrument 45 because the amplification of the photon P2 by the device 40 preserves its polarization.

In particular, if the photon P2 is the entangled photon of a photon P1 absorbed in one of two complementary polarizations known to the first receiver, the N multiplied photons P20 are measured with a polarization which can be deduced from the absorption polarization of the photon P1 by using the Jones matrix calculated during a calibration, as described above.

The measuring instrument 45 may comprise a succession of semi-reflective plates 452 and a mirror 453, as illustrated in FIG. 10A. The plates 452 and the mirror 453 direct the multiplied photons P20, which form a light flux, for example toward prisms 350 made of birefringent materials, preferably with an equal intensity. The filters 350 split the light flux into two orthogonally polarized light fluxes, so that the detectors 455 can either determine the intensity of said flux along each of the orthogonal directions or determine the phase shift between the two orthogonal components of the flux, for example by means of a Michelson interferometer or a Young's slit interferometer.

The interferometers are preferably arranged so that the light paths of the two orthogonal components are identical, the light flux originating from the multiplication of a single photon being very brief. The use of a plurality of pairs of orthogonal directions, for example offset by 45° from one another, advantageously makes it possible to measure the polarization, that is to say the direction of the polarization as well as the phase shift between the two directions, several times, thus allowing greater accuracy in the measurement.

FIG. 10B represents an example of such a Young's slit interferometer. Two waves 460 and 463 come from the prism 350. The wave 460 passes, for example, through a prism 461 which restores its propagation direction so that at 462 it becomes parallel to the wave 463. The wave 463 passes, for example, through a half-wave plate making it possible to align the electric field of said wave 465 with that of the wave 462. The waves 462 and 465 then pass through two holes made in a screen 466 before interfering with one another in order to form fringes on a screen 467, which is observed by a camera or is equipped with photosensitive sensors making it possible to determine the position of the brightest fringe on said screen 467.

Items of information, in particular items of information of the binary type, can be transmitted between the receivers 3 and 4 of a system 1 such as the one described in FIG. 1B, for example by following the steps illustrated in FIGS. 11A and 11B.

The correspondence protocol between the items of information to be transmitted, for example between sending a bit "0" or a bit "1" and the measurement or lack of measurement of the first photon P1, is determined before the start of transmission.

By way of example, the selection is made below not to measure the first photon P1 in order to transmit a "0" and to measure it in order to transmit a "1". Of course, the reverse choice or any other suitable correspondence would also be valid.

In step 10, two entangled photons P1 and P2 are emitted simultaneously from an emitter 2 toward receivers 3 and 4, respectively, the receiver 3 being placed closer to the emitter 2 than the receiver 4 is, as described above.

The emitted photons P1 and P2 have an indeterminate quantum state in a predetermined pair of complementary polarizations, for example a polarization at 45° if they are linearly polarized (the complementary polarizations being 0° and 90°).

In step 11, the photon P1 reaches the optical selector 30 of the receiver 3.

If a bit "0" is intended to be transmitted, the photon P1 is for example reflected by the optical selector on a perpendicular path in the example illustrated in FIG. 11A (although any other path as possible) so that it cannot reach the measuring instrument 35. The photon P1 may, in particular, be trapped in step 12 in a device 5 for protecting its quantum state, in order to avoid its absorption, at least so long as the second photon P2 has not reached the second receiver 4.

For example, the photon P1 preserves its polarization at 45°.

If a bit "1" is intended to be transmitted, the photon P1 passes for example through the optical selector 30 in order to be directed toward the measuring instrument 35, as illustrated in FIG. 11B.

The quantum state of the photon P1 is then measured by the measuring instrument 35 in step 13.

The photon P1 now has a determined quantum state, for example a vertical polarization (90°) or a horizontal polarization (0°). Instantaneously, the measurement carried out in step 13 projects the entangled photon P2 into a determined state.

In step 15, regardless of the item of information to be transmitted, the photon P2 reaches the optical amplifier 40 of the second receiver 4, where it is duplicated to form a flux of multiplied photons P20, each photon P20 having preserved the polarization of the photon P2.

In step 16, the polarization of the flux of photons P20 is measured by a measuring instrument 45.

If an intermediate result is obtained on average, for example a polarization at 45°, it is deduced therefrom that the first photon P1 has not been measured and a bit "0" is received.

If a quantum state corresponding to a measurement in the first receiver 3 is obtained, for example a vertical (90°) or horizontal (0°) polarization, it is deduced therefrom that the first photon P1 has been measured and a bit "1" is received.

Series of discrete values may furthermore be transmitted between the receivers 3 and 4 of a system 1 such as the one described in FIG. 1A, for example by following the steps illustrated in FIG. 12.

In step 10, two entangled photons P1 and P2 are emitted simultaneously from an emitter 2 toward receivers 3 and 4, respectively, for example with a linear polarization.

In step 17, the photon P1 reaches the polarization modifier 32, which converts the linear polarization of the photon P1 to a selected pair of complementary polarizations, the pair having been selected according to the Jones formalism and corresponding to a discrete value to be transmitted.

In step 13, the photon P1 is absorbed by the instrument 35 in one of the two complementary states of the selected pair, thereby projecting the entangled photon P2 into its complementary state.

The subsequent steps 15 and 17 are similar to those described above; the polarization of the photon P2 is measured by amplification then absorption, and the discrete value transmitted is deduced.

The invention is not limited to the measurement of a linear polarization of the photons. Other types of quantum state may be measured and/or other measuring means may be used, particularly measurements in other observable bases.

The photons P1 and P2 are for example emitted with a circular entangled polarization, and by measuring a linear polarization the measuring instrument 35 projects the photon P1, and by entanglement the photon P2, into a linear polarization basis.

As a variant, the photons P1 and P2 are emitted with a linear entangled polarization, and by measuring a circular polarization the measuring instrument 35 projects the photon P1, and by entanglement the photon P2, according to this observable basis.

In another example, the photons P1 and P2 are emitted with a vertical or horizontal entangled linear polarization, and the measuring instrument 35 measures a linear polarization at 45° or −45° to the vertical or the horizontal.

In one variant, the receiver 3 comprises two measuring instruments 35, one measuring a linear polarization and the other measuring a circular polarization. For example, the optical selector sends the photon P1 toward the first measuring instrument if a bit "1" is intended to be transmitted, toward the second measuring instrument if a bit "2" is intended to be transmitted, and prevents it from being measured if a bit "0" is intended to be measured.

In each of the examples above, the measuring instrument 45 of the second receiver 4 may be configured in order to detect whether or not the first photon P1 has been measured, and as appropriate, the polarization with which it has been measured at the first receiver.

Gyroscopes may furthermore be used at the emitter 2 and at the receivers 3 and 4 in order to determine the polarization direction of the photons P1 and P2, if they are emitted and transported toward the receivers with a linear polarization.

As mentioned above, the receivers 3 and 4 as well as the device 5 may be provided with devices for counting the photons during their absorption, and optionally after their waiting for the absorption of their entangled photon, which may be accompanied by timestamping of their arrival, as illustrated in FIG. 13. This can make it possible, for example, to control the correspondence between the pairs of entangled photons and the bits transmitted.

For example, each photon triggers the timestamping process by arriving at the receiver in step 80, in particular by reaching one of the measuring instruments 35 or 5D. Following this triggering event, in step 82 the receiver 3 copies, for example, the current time H on the clock of said receiver, for example written into a register R on a free memory register M, preferably after having subtracted the transit time of the photon in the waiting device 5 from the time of arrival at the 5D detector.

A similar device (not represented) may be arranged at the second receiver 4.

Preferably, the clocks making the timestamping which has just been described possible are synchronized for the two receivers 3 and 4, which optionally makes it possible to define photon processing time intervals that are common to the two receivers, and to process the "multiple" double pairs of photons emitted by the emitter 2.

The second receiver 4 may moreover comprise a switch 50 which is placed in front of the optical amplifier 40 and is configured in order to absorb or reflect the possible undesired photon or photons PE2 that reach the receiver 4 after the photon P2 within the same processing time interval, as represented in FIG. 14.

The switch 50 may furthermore absorb possible photons PA2 emitted by the amplifier 40 toward the emitter 2 during the amplification of the signal, or during the relaxation of molecules or atoms of the amplifier medium.

The switch 50 is, for example, regulated by an electronic mechanism (not represented), which is itself controlled by the measuring instruments 45 when they or one of them detects photons.

In some embodiments, the system according to the invention may comprise a plurality of emitters arranged differently relative to the receivers, particularly in order to establish bidirectional communication.

In the example illustrated in FIG. 15, the system 1 comprises two emitters 21 and 22, each emitting pairs of entangled photons toward two receivers 91 and 92.

The emitter 21 is closer to the receiver 91 than to the receiver 92, and the emitter 22 is closer to the receiver 92 than to the receiver 91. This arrangement makes it possible for the receivers 91 and 92 to communicate bidirectionally; the photon P11 emitted by the emitter 21 arrives first at the receiver 91, which may then act as the first receiver 3, that is to say it may transmit an item of information toward the receiver 92 which receives its entangled photon P12 and acts as the second receiver 4.

Conversely, the photon P21 emitted by the emitter 22 arrives first at the receiver 92, which this time makes it possible to transmit an item of information toward the receiver 91, which receives the entangled photon P22. The mechanism of transmitting information, in particular binary information, is for example similar to that which has been described above with reference to FIGS. 11 and 12.

Reflection devices 93 and 94 may be arranged in proximity to the receivers 91 and 92, respectively, in order to reflect the photons possibly reflected by the receivers 91 and 92.

With reference to FIG. 16 a variant of implementation of the invention will now be described, this variant being intended to verify that information transmitted by the emitter 2 has not been eavesdropped and where appropriate to generate a shared key for the exchange of information between the receivers 3 and 4, based on the transfer of information that it is known not to have been eavesdropped.

The system of FIG. 16 has been modified by adding at least one polarizing filter 46 before the entry of the receiver 4, this filter having a polarization direction that corresponds to the polarization direction expected for photons having travelled from the emitter to the receiver 4. The polarizing filter 46 is thus placed upstream of the change of photon polarization that is initiated by the receiver 3 sending information to the receiver 4.

The filter 46 prevents a fraudulent receiver from replacing the authentic receiver 4, from observing the exact polarization of the entangled photon after multiplication of said photon, then from sending to the authentic receiver 4 a fraudulent photon, instead of the authentic photon, which would necessarily be observed by the receiver 4 to have the same relative polarization as the authentic photon, because, on the one hand, if said photon is not entangled with another photon its polarization will not change after having passed through the filter 46 and therefore it will have the polarization imposed by the filter 46 and not the polarization of the authentic photon, and, on the other hand, if the fraudulent photon is entangled with another photon, called the second fraudulent photon, it is not possible to set the relative polarization of these fraudulent photons nor moreover to destroy or stop said fraudulent photon after it has passed through the filter 46, should the relative polarization of its entangled photon be verified inadequate, by a third piece of apparatus.

It is therefore extremely improbable for all or some of the photons of a group of entangled photons observed by both receivers 3 and 4 to have been observed elsewhere if their relative polarizations are still different.

It is possible to verify statistically the equality of the quantum state of the photons used to transmit the items of information that reach each of the two receivers 3 and 4, and to deduce therefrom that the probability that some of the photons have been observed is low, by applying the following method:

On reception of the photons by each of the receivers 3 and 4, the receivers note the time of reception and the exact polarization of the photons through use of photon detectors, and not solely the pair of complementary polarizations to which they belong. The times and polarizations of detected photons that are too close to one another to have their polarization or their arrival time measured independently are however, preferably, not noted, and the two receivers 3 and 4 preferably possess synchronized clocks.

After a determined number of photons bearing information I have been received, the second receiver 4 generates a message containing the precise time of detection and polarization of each of the photons these attributes of which were noted and that were considered to be transmitting information and therefore to belong to a group of NSP or more photons having a given polarization or indeed the complementary polarization of this polarization; NSP is defined above as the predetermined threshold number of photons received with a given polarization or its complementary polarization allowing the receipt of information to be identified.

This message is signed, preferably using the random hash technique described in patent application U.S. 20210165914 A1, by the receiver 4, then sent to the receiver 3 with said signature, preferably employing a quantum transmission means such as described above, then the signature of the received message is verified, as is the correspondence of the relative polarizations of the photons received by the two receivers, for pairs of photons the two photons of which both reached the receivers. This information I may be declared to not have been eavesdropped during its transmission between the two receivers if the verification of the signature indicates that it is authentic and if the proportion of polarizations that do not correspond is lower than a given threshold, for example 1% if 450 different polarization pairs are used, or a multiple such as 2 of the probability of two pairs of different entangled photons being emitted at times that are indiscernible by the receivers.

In addition, one relative polarization of each of the pairs of polarizations of photons that were considered to be transmitting information I, if this relative polarization was verified as being different for each of the photons that reached each of the receivers, may be used to form a sequence of bits forming a randomly generated key known solely to each of the receivers; the receiver 3 that verified the concomitance of the relative polarizations will send, to the other receiver 4, a signed message, which is preferably signed using the random hash technique, and which is formed by the list of the reception dates of photons the relative polarizations of which did not correspond or the entangled photon of which was never received by the receiver 3.

Thus, in one example, the following steps are implemented.

Step 1

The receiver 4 receives, from the emitter 2, a flux of photons conveying information and establishes a first list of the reception dates of the photons that served to define this information, and the relative polarization designating that of the two complementary polarizations in which the photon was received.

Step 2

The receiver 4 forms a message consisting of the list of the information collected in the preceding step, creates an electronic signature of this list and transmits said list and the signature to the receiver 3.

Step 3

The receiver 3 receives the list and signature then verifies said signature.

Step 4

The receiver 3 makes a second list consisting of elements of the first list for which the relative polarizations of the photons received by the receivers 3 and 4 are the same or for which the entangled photon never reached the receiver 3, said receiver 3 having stored in a register the relative polarization of each photon that served to transmit information and its reception date. Knowing the difference in the time taken by the entangled photons to travel the path between the emitter 2 and each of the two receivers 3 and 4, i.e. path time, the receiver 3 may determine, for each photon of the first list, the relative polarization of the photon that it received at the reception date of the photon by the receiver 4 minus the path time. This second list is preferably made up of two separate parts, a first of these parts containing photons the entangled photon of which never reached the first receiver 3 and a second of these parts containing photons both entangled photons of which reached their respective receivers but with equal relative polarizations.

Step 5

If the number of elements of the second list restricted to pairs of entangled photons each of the two photons of which reached their respective receivers is lower than the product of a predetermined ratio multiplied by the count of the elements of the first list restricted to pairs of entangled photons each of the two photons of which reached their respective receivers, then the information is declared to have been transmitted without having been eavesdropped.

Step 6

If the information is declared to have been transmitted without having been eavesdropped, then the second list is sent signed by the receiver 3 to the receiver 4, then a third list is created by the receiver 3, this list consisting of the relative polarizations of the photons featuring in the first list but not featuring in the second list, i.e. regarding photons for which the relative polarizations were observed to be different.

In the contrary case, i.e. if the aforementioned product is higher than said threshold, a message indicating that the transmission is liable to have been eavesdropped is sent by the receiver 3 to the receiver 4.

Step 7

On reception of the second list by the receiver 4 and after verification of the signature, the third list is recreated in the receiver 4 using the first and second lists, then a signed message, confirming successful receipt of the second list, is sent by the receiver 4 to the receiver 3.

Step 8

The receiver 4 may use the third list as shared key with the receiver 3, and, on reception by the receiver 3 of the message transmitted in step 7, the receiver 3 may use the third list as shared key with the receiver 4.

The invention claimed is:

1. A quantum communication system, comprising:
an emitter of entangled photons, comprising a source configured in order to generate at least one pair of entangled photons comprising a first photon emitted on a first propagation path and simultaneously a second photon emitted on a second propagation path different to the first propagation path;
a first receiver arranged on the first propagation path, comprising:
at least one first instrument arranged in order to absorb the first photon in one of two complementary polarizations, the polarization of the photon being indeterminate in an observable basis according to which the first instrument absorbs the photons,
an optical selector arranged upstream of said at least one first instrument and configured in order either to allow the first photon to pass through toward said at least one first instrument or to prevent it from being measured;
a second receiver arranged on the second propagation path so as to be reached by the second photon after the first photon has reached the optical selector and/or after it has been able to reach the instrument of the first receiver, said second receiver comprising an optical amplifier configured to multiply the second photon while preserving its polarization, and, arranged downstream of the amplifier, a measuring instrument configured to measure the average quantum state of the multiplied photons.

2. The quantum communication system according to claim 1, wherein the first receiver comprises at least one second instrument, the optical selector being arranged upstream of the first and second instruments and configured in order either to allow the first photon to pass through while directing it toward one or other of the instruments or to prevent it from being absorbed.

3. The quantum communication system according to claim 1, wherein the emitter is configured in order to generate a plurality of pairs of entangled photons successively.

4. The quantum communication system according to claim 1, wherein the optical selector comprises a reflector.

5. The quantum communication system according to claim 1, wherein the optical selector comprises a device whose refractive index and/or reflection direction are controlled.

6. The quantum communication system according to claim 1, further comprising a device for protecting the quantum state of at least one photon which is arranged in proximity to the first receiver so as to protect the quantum state of the first photon in the event that it is prevented from being measured by the optical selector, said quantum state of the first photon being protected at least until the second photon has been multiplied at the second receiver.

7. The quantum communication system according to claim 6, wherein the device for protecting the quantum state comprises a transparent space.

8. The quantum communication system according to claim 1, wherein at least one instrument of the first receiver comprises at least one filter configured to send the first photon toward at least one photon detector.

9. The quantum communication system according to claim 1, wherein the measuring instrument of the second receiver comprises at least one photon detector arranged in order to measure the polarization of the light originating from the multiplication of the second photon.

10. The quantum communication system according to claim 1, wherein the measuring instrument of the second receiver comprises a succession of semireflective plates arranged downstream of the optical amplifier, said plates directing the flux of multiplied photons with an equal intensity toward polarizing filters, downstream of which detectors are arranged.

11. The quantum communication system according to claim 1, wherein the optical amplifier is a doped-fiber amplifier.

12. The quantum communication system according to claim 1, wherein the first receiver and/or the second receiver comprises one or more dichroic filters.

13. The quantum communication system according to claim 1, wherein the emitter and each of the receivers comprises a clock, the clocks of the emitter and of the receivers being synchronized with one another.

14. The quantum communication system according to claim 1, wherein the second receiver comprises a switch arranged in front of the optical amplifier and configured in order to absorb or reflect the photon or photons subsequent to a first photon reaching said second receiver in a predetermined time interval.

15. The quantum communication system according to claim 1, further comprising a second emitter capable of generating one or more pairs of entangled photons, the second emitter being located closer to the second receiver than to the first receiver.

16. A quantum communication method using the quantum communication system according to claim 1, comprising the steps of:

generating a pair of entangled photons from an emitter, the first photon of the pair being emitted toward a first receiver and the second photon of the pair being emitted simultaneously toward a second receiver, the first and second photons being entangled, the second receiver being located on the propagation path of the second photon further away from the emitter than the first receiver, so that it arrives there later, according to information to be transmitted, selecting to absorb or not absorb the first photon in one of two pairs of complementary polarizations when it reaches the first receiver, by using an optical selector which does or does not direct said photon toward an instrument or toward one of a plurality of instruments,. in the event that the selection is made not to absorb the photon in a predefined polarization, trapping said first photon in a protection device configured to avoid its absorption at least so long as the second photon has not reached the second receiver, at the second receiver, duplicating the second photon to form a flux of multiplied photons by using an amplification device, each multiplied photon having preserved the quantum state of the second photon, measuring the average quantum state of multiplied photons and determining according to this measurement whether the first photon has been absorbed at the first receiver, and/or with which instrument, in order to deduce therefrom the information transmitted ("0", "1") by the first receiver.

17. The quantum communication method according to claim 16, wherein the polarization of the pair of entangled photons being is indeterminate in an observable basis or bases, in which the instruments of the first receiver absorb them.

18. The quantum communication method according to claim 16, wherein the pair of entangled photons reaches the receivers with a linear entangled polarization, one of the two complementary absorption polarizations being circular, the second receiver being arranged in order to distinguish whether the average polarization of the flux of multiplied photons is circular or linear, and to determine according to this distinction whether or not the first photon has been measured.

19. The quantum communication method according to claim 16, wherein the pair of entangled photons reaches the receivers with a circular entangled polarization, the quantum state measured at the first receiver being a linear polarization, the second receiver being arranged in order to distinguish whether the average polarization of the flux of multiplied photons is circular or linear, and to determine according to this distinction whether or not the first photon has been measured.

20. The quantum communication method according to claim 16, wherein the pair of entangled photons reaches the receivers with a vertical or horizontal linear polarization, the quantum state measured at the first receiver being a linear polarization at 45° or −45° to the vertical or the horizontal, the second receiver being arranged in order to distinguish whether the average linear polarization of the flux of multiplied photons is at 45° or −45°, or the vertical or the horizontal, and to determine according to this distinction whether or not the first photon has been measured.

21. The quantum communication method according to claim 16, wherein a plurality of pairs of entangled photons are generated successively by the emitter, each pair of photons are configured to transmit an item of information ("0", "1", "2") from the first receiver to the second receiver.

22. The quantum communication method according to claim 16, wherein it is verified that an item of information transmitted by a flux of photons from the emitter to the receiver has not been eavesdropped by implementing the following steps:

the second receiver establishes a first list of reception dates of the photons that conveyed item of information, and relative polarization designating that of the two complementary polarizations in which each photon was received;

the second receiver generates a message containing the list collected in the preceding step, creates an electronic signature of this list and transmits said list and the signature to the receiver;

the first receiver receives the list and signature then verifies said signature;

the first receiver makes a second list including elements of the first list for which the relative polarizations of the photons received by the first and second receivers and are equal, or indeed for which the entangled photon never reached the first receiver, two entangled photons having different relative polarizations;

if the number of elements of the second list restricted to pairs of entangled photons each of the two photons of which reached their respective receivers is lower than the product of a predetermined ratio multiplied by the count of the elements of the first list restricted to pairs of entangled photons each of the two photons of which reached their respective receivers, then the item of information is declared to have been transmitted without having been eavesdropped.

23. The quantum communication method according to claim 22, wherein:

the item of information is declared to have been transmitted without having been eavesdropped, and then subsequently the second list is sent signed by the first receiver to the second receiver, then a third list is created by the first receiver, this list including the relative polarizations of the photons featuring in the first list but not featuring in the second list, on reception of the second list by the second receiver and after verification of the signature, the third list is recreated in the second receiver using the first and second lists, then a signed message, confirming successful receipt of the second list, is sent by the second receiver to the first receiver; and the second receiver uses the third list as shared key with the first receiver, and, on reception by the first receiver of the message transmitted by the second receiver in the preceding step, the first receiver uses the third list as shared key in exchanges with the second receiver.

24. The quantum communication method according to claims 23, wherein a polarizing filter is placed upstream of the second receiver.

\* \* \* \* \*